United States Patent

Matsumura et al.

[11] Patent Number: 5,876,851
[45] Date of Patent: Mar. 2, 1999

[54] FILM FROM POLYCARBONATE, POLYESTER TO BE LAMINATED ON METAL

[75] Inventors: Shunichi Matsumura; Ryoji Tsukamoto; Masaaki Tsukioka; Hiroo Inata, all of Iwakuni; Seiji Itoh, Matsuyama, all of Japan

[73] Assignee: Teijin Limited, Osaka, Japan

[21] Appl. No.: 367,360

[22] PCT Filed: May 18, 1994

[86] PCT No.: PCT/JP94/00801

§ 371 Date: Jan. 19, 1995

§ 102(e) Date: Jan. 19, 1995

[87] PCT Pub. No.: WO94/26809

PCT Pub. Date: Nov. 24, 1994

[30] Foreign Application Priority Data

| May 20, 1993 | [JP] | Japan | 5-118284 |
| May 19, 1993 | [JP] | Japan | 5-116954 |
| Jul. 2, 1993 | [JP] | Japan | 5-164538 |
| Sep. 30, 1993 | [JP] | Japan | 5-244515 |
| Jan. 25, 1994 | [JP] | Japan | 6-006440 |

[51] Int. Cl.[6] .......................... B32B 27/36; C08L 69/00; C08L 67/02
[52] U.S. Cl. ..................... 428/412; 525/439; 525/463; 528/196; 528/204
[58] Field of Search ............... 428/412; 528/196, 528/204; 525/463, 439, 433

[56] References Cited

U.S. PATENT DOCUMENTS

| 3,098,056 | 7/1963 | Schnell | 525/463 |
| 4,025,489 | 5/1977 | Bailey | 528/196 |
| 4,115,358 | 9/1978 | Vestergaard | 528/196 |
| 4,362,775 | 12/1982 | Yabe et al. | |
| 4,475,241 | 10/1984 | Mueller | 428/412 |
| 4,493,872 | 1/1985 | Funderburk | 428/412 |
| 4,539,370 | 9/1985 | Nouverté | 525/433 |
| 4,933,424 | 6/1990 | Rosenquist | |
| 4,943,619 | 7/1990 | Bell | 525/463 |
| 5,156,775 | 10/1992 | Blount | 252/609 |
| 5,182,344 | 1/1993 | Parker | 525/463 |
| 5,187,256 | 2/1993 | Kirk | 525/433 |
| 5,308,489 | 5/1994 | Dhein | 525/433 |

FOREIGN PATENT DOCUMENTS

| 0209393 | 7/1986 | European Pat. Off. |
| 0270374 | 12/1987 | European Pat. Off. |
| 0434988 | 11/1990 | European Pat. Off. |
| 63-182350 | 7/1988 | Japan |
| 64-22530 | 1/1989 | Japan |
| 1192545 | 8/1989 | Japan |
| 1192546 | 8/1989 | Japan |
| 257339 | 2/1990 | Japan |
| 2245022 | 9/1990 | Japan |
| 5254065 | 10/1993 | Japan |

*Primary Examiner*—Christopher Henderson
*Attorney, Agent, or Firm*—Sherman and Shalloway

[57] ABSTRACT

A film to be laminated on a metal, which is formed of a polycarbonate resin having a high concentration of terminal hydroxyl groups or a composition comprising said resin and a polyester resin or a film to be laminated on a metal, which is formed by laminating the above film and a polyester film. The film is excellent in adhesion to a metal plate, moldability, heat resistance, retort resistance, odor retention property, impact resistance dent resistance and processability into a can, such as drawing fabrication, ironing fabrication or the like for producing metal cans.

16 Claims, No Drawings

FILM FROM POLYCARBONATE, POLYESTER TO BE LAMINATED ON METAL

FIELD OF THE INVENTION

This invention relates to a film to be laminated on a metal, and, more specifically, to a film to be laminated on a metal, which has excellent adhesion to a metal plate and is excellent in a processability into a can, such as drawing fabrication, ironing fabrication or the like for producing metal cans, when laminated on a metal plate and which provides a laminated metal plate having excellent impact resistance.

PRIOR ART

Heretofore, coating has generally been applied to the inner and outer surfaces of a metal can to prevent the surface from corrosion, and thermocurable resins have been used for such coating.

However, thermocurable resin coatings are generally of a solvent type and requires a long time and a heating at a temperature of 150° to 250° C. to form a coating onto a film. A large amount of an organic solvent is scattered or evaporated at the time of baking, which exerts adverse effects on the environment and causes problems in working safety. In addition, cracks and pinholes are easily generated at the time of subsequent processing. Consequently, solutions to these problems have been desired.

In recent years, for the purposes of simplifying production process, improving hygienic aspect, and eliminating pollution, development of processes for obtaining rust resistance without using an organic solvent has been attempted, one of which is to coat a metal can with a thermoplastic resin film. In other words, studies are being conducted on the process in which a thermoplastic resin film is laminated on a metal plate such as tin-plated steel plate, tin-free steel plate, aluminum plate or the like, and then is subjected to drawing fabrication or the like to produce a can. As this thermoplastic resin film, a polyolefin film and a polyamide film have been tried to use, but they did not satisfy all requirements for moldability, heat resistance, odor retention and impact resistance.

Japanese Laid-Open Patent Publication Sho 56-10451 and Japanese Laid-Open Patent Publication Hei 1-192546 disclose that a biaxially oriented polyethylene terephthalate film is laminated on a metal plate via an adhesive layer of a low-melting polyester and the laminated metal plate is used as a can-making material. However, although the biaxially oriented polyethylene terephthalate film has excellent heat resistance and odor retention property, its moldability is insufficient. Therefore, blanching (generation of fine cracks) or rupture of the film may occur in the course of can-making fabrication which inevitably invites large deformation.

Japanese Laid-Open Patent Publication Hei 1-192545 and Japanese Laid-Open Patent Publication Hei 2-57339 disclose that an amorphous or extremely low-crystalline aromatic polyester film is laminated on a metal plate and the laminated metal plate is used as a can-making material.

However, although the amorphous or extremely low-crystalline aromatic polyester film is superior in moldability, it is inferior in odor retention property. Furthermore, it is liable to embrittle by post-treatment such as printing after can-making fabrication, retort sterilization and the like and a prolonged storage, and may deteriorate to a film which is readily cracked by external impact.

Japanese Laid-Open Patent Publication Sho-64-22530 discloses that a thermoset, biaxially oriented polyethylene terephthalate film having a low orientation is laminated on a metal plate and the laminated metal plate is used as a can-making material.

However, this film does not attain a low orientation to such an extent that it can be used in can fabrication, and even if fabricable in the region with a small deformation, it is readily embrittled by subsequent printing and retort treatment such as sterilization of can contents and may deteriorate to a film which is readily cracked by external impact.

Japanese Laid-Open Patent Publication Hei 5-254065 discloses a film to be laminated on a metal, which is prepared by laminating a film of a polymer having a glass transition temperature, Tg, of at least 85° C., such as polycyclohexanedimethylene terephthalate, polycarbonate, phenoxy resin, polyethylene naphthalate, polymethyl methacrylate, polyacrylonitrile or polystyrene, on a film formed of a copolyester having a melting point of 140° to 200° C., such as polybutylene (terephthalate/isophthalate), poly(butylene/hexamethylene)terephthalate or polybutylene (terephthalate/naphthalate).

The above publication teaches that the copolyester layer provides this laminate film with adhesion property, impact resistance, retort resistance and moldability and the polymer layer having a Tg of at least 85° C. provides the laminate film with change in flavor and handling property, moldability and denaturation by heat.

Researches conducted by the present inventors reveal that the copolyester film undergoes a structural change with time and gradually deteriorates in impact resistance, particularly at low temperatures. Therefore, it was found that, when impact was applied to the film later after the fime was laminated on a metal, the film was readily to crack. Low impact resistance at low temperatures causes a serious problem in the case of metal cans for refreshing beverage which are handled in a cooled state.

Although polycarbonate is excellent in resistance to mold-processing of a laminated plate, heat resistance and impact resistance, an ordinary polycarbonate has insufficient adhesion to metals and odor retention property.

It is therefore an object of the invention to provide a novel film to be laminated on a metal.

Another object of the invention is to provide a polycarbonate film to be laminated on a metal, which has excellent adhesion to metal plates as well as excellent moldability, impact resistance and in particular, resistance to impact after a lapse of time when it is laminated on a metal plate.

Still another object of the invention is to provide a film to be laminated on a metal, which is formed of a blend of a polyester and a polycarbonate, having the same performance as above.

A further object of the invention is to provide a film to be laminated on a metal, which is a laminate film consisting of a polyester layer and a polycarbonate layer and having excellent adhesion to a metal plate, moldability, heat resistance, retort resistance, odor retention property, and impact resistance.

Other objects and advantages of the invention will become more apparent from the description below.

DISCLOSURE OF THE INVENTION

According to the present invention, the above objects and advantages of the present invention can be attained first by a polycarbonate film to be laminated on a metal, (A) which is formed of a polycarbonate resin (1) which consists essentially of a recurring unit represented by the following formula (1):

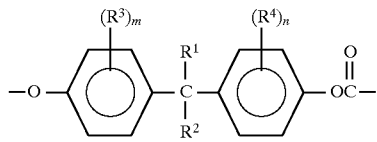

wherein $R^1$ and $R^2$ are independent from each other and are each hydrogen atom, an alkyl group having 1 to 5 carbon atoms, or a cycloalkyl group having 5 to 6 ring carbon atoms, or $R^1$ and $R^2$ may form a cycloalkyl group having 5 to 6 ring carbon atoms together with a carbon atom to which $R^1$ and $R^2$ are bonded, $R^3$ and $R^4$ are independent from each other and are each an alkyl group having 1 to 5 carbon atoms, a phenyl group, or a halogen atom, and m and n are independent from each other and are 0, 1 or 2, (2) which has terminal OH groups of at least 20 eq/$10^6$ g, and (3) which has a viscosity-average molecular weight of 10,000 to 40,000, (B) which has a reduction rate of elongation after 24 hours of immersion in water heated at 50° C. of 30% or less, and (C) which has a film thickness in the range of 5 to 100 μm.

The polycarbonate film to be laminated on a metal of the present invention is formed of a polycarbonate resin specified in (1), (2) and (3) in above (A).

In the above formula (1) specifying the structure of this polycarbonate resin, $R^1$ and $R^2$ are independent from each other and are each hydrogen atom, an alkyl group having 1 to 5 carbon atoms, or a cycloalkyl group having 5 to 6 ring carbon atoms, or $R^1$ and $R^2$ may form a cycloalkyl group having 5 to 6 ring carbon atoms together with a carbon atom to which $R^1$ and $R^2$ are bonded.

The alkyl group having 1 to 5 carbon atoms may be straight-chain or branched-chain, and examples thereof include methyl, ethyl, n-propyl, iso-propyl, n-butyl, iso-butyl, pentyl and the like.

Examples of the cycloalkyl group having 5 to 6 ring carbon atoms include cyclopentyl and cyclohexyl.

$R^3$ and $R^4$ are independent from each other and an alkyl group having 1 to 5 carbon atoms, a phenyl group, or a halogen atom.

Examples of the alkyl group having 1 to 5 carbon atoms are the same as above.

Examples of the halogen atom include fluorine, chlorine, bromine and the like.

m and n are independent from each other and are 0, 1 or 2.

A preferred example of the recurring unit represented by the above formula (1) is a bisphenol A carbonate unit wherein $R^1$ and $R^2$ are each methyl and m and n are 0.

The polycarbonate resin used in the present invention may comprise the same type of recurring units represented by the above formula (1) or two or more different types of recurring units represented by the above formula (1).

The polycarbonate resin used in the present invention needs to contain terminal OH groups in an amount of at least 20 eq/$10^6$ g. The inventors of the present invention have found that the amount of the terminal OH group influences adhesion between the polycarbonate and the metal plate and that the more the amount of the terminal OH group, the greater the adhesion force between the polycarbonate and the metal plate becomes. If the amount of the terminal OH groups is below 20 eq/$10^6$ g, sufficient adhesion force cannot be achieved when the polycarbonate resin film is laminated on a metal plate.

The amount of the terminal OH groups is preferably at least 35 eq/$10^6$ g, more preferably at least 50 eq/$10^6$ g, further more preferably at least 60 eq/$10^6$ g, still further more preferably at least 70 eq/$10^6$ g, and particularly preferably 80 to 150 eq/$10^6$ g.

The polycarbonate resin used in the present invention has a viscosity-average molecular weight of 10,000 to 40,000.

If the viscosity-average molecular weight is below 10,000, the resulting polycarbonate film itself will have insufficient mechanical properties and is liable to peel off from the metal surface. If the viscosity-average molecular weight is above 40,000, it is difficult to adjust the amount of the terminal OH groups to at least 20 moles/$10^6$ g. In addition, since the polymer has high melt viscosity, its wettability to the metal plate is insufficient when it is laminated on the metal plate, and high adhesion force cannot be achieved. In this case, the film has the same problem of peeling off from the metal plate. The viscosity-average molecular weight of the polycarbonate resin is preferably in the range of 13,000 to 35,000, more preferably 15,000 to 30,000.

The polycarbonate resin is generally produced by a reaction of a corresponding dihydric phenol with a carbonate precursor such as phosgene in a solvent such as methylene chloride in the presence of a known acid receptor or a known molecular weight adjusting agent (interfacial polymerization process) or an ester interchange reaction of a corresponding dihydric phenol with a carbonate precursor such as diphenyl carbonate (melt polymerization process).

The production of the polycarbonate resin of the present invention is not limited to a particular process, and may be produced by the following processes, for example. That is, they include:

(1) a process in which a dihydric phenol is reacted in excess with the carbonate precursor when the resin is produced by the interfacial polymerization process;

(2) a process in which endcapping is performed when the resin is produced by the interfacial polymerization process;

(3) a process in which the proportion of the dihydric phenol and the carbonate precursor is adjusted when the resin is produced by the melt polymerization process;

(4) a process in which a polyhydroxy compound is added in the latter stage of a polymerization reaction when the resin is produced by the melt polymerization process; and (5) a process in which a polycarbonate resin having terminal OH groups of less than 20 moles/$10^6$ g and an appropriate amount of a dihydric phenol are melt mixed and a catalyst is added to the resulting mixture as required to allow the carbonate resin and the dihydric phenol to react each other thereby to increase the amount of the terminal OH group.

In the processes (1) and (2) above, as the dihydric phenol, 2,2-bis(4-hydroxyphenyl)propane, bis(4-hydroxyphenyl)methane, 1,1-bis(4-hydroxyphenyl)ethane, 1,1-bis(4-hydroxyphenyl)cyclohexane, bis(4-hydroxyphenyl)ether, 2,2-bis(3-methyl-4-hydroxyphenyl)propane, 2,2-bis(3,5-dimethyl-4-hydroxyphenyl)propane, 4,4'-biphenol, phenolphthalein and the like are preferably used.

The interfacial polymerization process is advantageously carried out by reacting a dihydric phenol with phosgene in a two-layer solvent consisting of an alkaline aqueous solution of a dihydric phenol and an organic solvent incompatible with water such as methylene chloride.

In the process (2), a compound represented by the following formula (2):

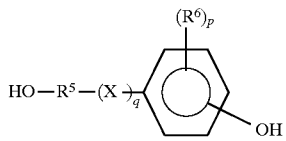

wherein $R^5$ is an alkylene group having 2 to 6 carbon atoms or a cycloalkylene group having 5 to 10 carbon atoms, $R^6$ is an alkyl group having 1 to 3 carbon atoms, X is —O— or —CO—, p is an integer of 0 to 3, and q is 0 or 1, is preferably used as an endcapping agent.

In the above formula (2), $R^5$ is selected from an alkylene group having 2 to 6 carbon atoms and a cycloalkylene group having 5 to 10 carbon atoms. Examples of $R^5$ include ethylene, propylene, trimethylene, tetramethylene, isopropylidene, neopentylene, pentamethylene, hexamethylene, isobutylene, 1,4-cyclohexylene and the like. $R^6$ is hydrogen atom or an alkyl group having 1 to 3 carbon atoms. Examples of the alkyl group include methyl, ethyl, propyl and isopropyl. X is —O— or —CO—, and q is 0 or 1. When q is 0, $R^5$ and a benzene ring are directly bonded together. P is an integer of 1 to 3.

Specific examples of the compound represented by the formula (2) include 4-(2-hydroxyethyl)phenol, 3-(2-hydroxyethyl)phenol, 4-(2-hydroxyethyl)-2,6-dimethylphenol, 4-(3-hydroxypropyl)phenol, 3-(3-hydroxypropyl)phenol, 4-(3-hydroxypropyl)-2,6-dimethylphenol, 4-(2-hydroxyethoxy)phenol, 3-(2-hydroxyethoxy)phenol, 4-(2-hydroxyethoxy)-2,6-dimethylphenol, 4-(3-hydroxypropyloxy)phenol, 4-(3-hydroxypropyloxy)-2,6-dimethylphenol, 4-(β-hydroxypropionyl)phenol, 3-(β-hydroxypropionyl)phenol, 4-(β-hydroxypropionyl)-2,6-dimethylphenol and the like.

The compounds represented by the formula (2) may be used alone or in a combination of two or more. A known endcapping agent such as phenol and t-butyl phenol may be used in conjunction with the above compound.

Use of the compound represented by the formula (2) is not limited to a particular amount, and it may be used in such an amount that a terminal group concentration of at least 20 eg/$10^6$ g can be achieved. The amount of the compound ranges preferably from 0.2 to 20 mol %, more preferably from 0.5 to 10 mol % based on the amount of the dihydric phenol used.

In polymerization, a catalyst such as a tertiary amine such as triethylamine and pyridine or a quaternary ammonium such as tetra-n-butylammonium bromide is preferably used.

In the processes (3) and (4) above, the same examples of the dihydric phenol as those provided for the processes (1) and (2) above may be used.

In the processes (3) and (4), the catalyst is not limited to a particular kind, and may be of any kind, of a catalyst which promotes a reaction between a polycarbonate and a dihydric phenol. Examples of the catalyst include alkaline metal compounds such as sodium hydroxide, lithium hydroxide, potassium hydroxide, sodium bicarbonate, lithium bicarbonate, potassium bicarbonate, sodium carbonate, lithium carbonate, potassium carbonate, sodium acetate, lithium acetate, potassium acetate, sodium boron hydride, lithium boron hydride, potassium boron hydride, sodium stearate, lithium stearate, potassium stearate, sodium benzoate, lithium benzoate, potassium benzoate, 2-sodium salt of bisphenol A, 2-lithium salt of bisphenol A and 2-potassium salt of bisphenol A, sodium salts of a phenol, lithium salts of a phenol and potassium salts of a phenol, and the like; alkaline earth metal compounds such as calcium hydroxide, barium hydroxide, magnesium hydroxide, strontium hydroxide, calcium bicarbonate, barium bicarbonate, magnesium bicarbonate, strontium bicarbonate, barium carbonate, magnesium carbonate, strontium carbonate, calcium acetate, barium acetate, magnesium acetate, strontium acetate, magnesium stearate, strontium stearate, and the like; tertiary amine compounds such as methyl imidazole, N-ethyl piperidine, and the like; quaternary ammonium salts such as tetramethyl ammonium hydroxide and the like; quaternary phosphonium salts such as tetraphenyl phosphonium hydroxide and the like; boric acid; boric acid esters such as triphenyl borate and the like; oxides of aluminum, zinc, titanium, tin, germanium, antimony and the like; alkoxide; carboxylic acid salts; and the like. These catalysts may be used alone or in a combination of two or more. The catalyst is preferably used in an amount of $10^{-3}$ to $10^{-7}$ mol %, more preferably $10^{-4}$ to $10^{-6}$ mol %, based on the amount of the polycarbonate.

Melt reaction or mixing temperature is preferably in the range of about 180° to 320° C., more preferably about 200° to 300° C. Melt reaction or mixing time may be a time enough to allow the polycarbonate precursor or the polycarbonate to react with a polyhydroxy compound such as a dihydric phenol, and this time differs depending on the type and addition amount of the polyhydroxy compound, the type and addition amount of the catalyst and the mixing temperature, but ranges preferably from about 1 to 360 minutes, especially preferably from about 2 to 240 minutes.

This melt reaction or mixing may be effected in a reactor equipped with a stirrer or effected continuously using a melt kneading extruder. The latter method is preferred because a film can be formed simultaneously with extrusion. The melt reaction or mixing is preferably carried out in a stream of an inert gas such as nitrogen and argon to prevent coloring and deterioration of the polycarbonate.

In the process (4) above, as the polyhydroxy compound used in the latter stage of the polymerization reaction, a dihydric phenol equivalent to the above-mentioned dihydric phenol and a compound represented by the following formula (3):

wherein $R^7$ is a hydrocarbon group having a valence of l and 1 to 20 carbon atoms which may contain a hetero atom, l being an integer of 2 to 4, are preferably used.

Preferred examples of the compound of the formula (3) include the following compounds.

In the case of l=2, the preferred examples include trimethylene glycol, propylene glycol, tetramethylene glycol, neopentylene glycol, hexamethylene glycol, decamethylene glycol, dodecamethylene glycol, cyclohexane-1,4-dimethanol, m-xylylene glycol, p-xylylene glycol, 1,4-bis(2-hydroxyethoxy)benzene, 1,3-bis(2-hydroxyethoxy)benzene, 2,2-bis(4-(2-hydroxyethoxy)phenyl)propane, 2,2-bis(3,5-dimethyl-4-(2-hydroxyethoxy)phenyl)propane, bis(4-(2-hydroxyethoxy)phenyl)sulfone, bis(4-(2-hydroxyethoxy)phenyl)ether, and the like.

In the case of l=3, the preferred examples include trimethylol propane, 1,2,4-trihydroxymethylbenzene, 1,3,5-trihydroxymethylbenzene and the like.

In the case of l=4, they include pentaerythritol and the like.

Among these, the compounds wherein l is equal to 2 are the most preferred as the polyhydroxy compound. The proportion of the polyhydroxy compound is not limited particularly and may be any proportion, provided that the terminal OH groups of the object polycarbonate can be contained in an amount of at least 20 eq/$10^6$ g. However, an OH group concentration of the polyhydroxy compound is preferably at least 0.5 eq. %, more preferably at least 1.0 eq. %, with respect to the polycarbonate.

The polyhydroxy compound used in the latter stage of the polymerization reaction is advantageously added when the viscosity-average molecular weight of the polycarbonate reaches at least 10,000, more preferably at least 18,000.

The film of the present invention is formed of the above-mentioned polycarbonate resin, has, (B), a reduction rate of elongation after 24 hours of immersion in water heated at 50° C. of 30% or less and has, (C), 5 to 100 µm in thickness.

Because of a small reduction rate of elongation after immersion in water, the film of the present invention exhibits excellent resistance to impact after a lapse of time when it is laminated on a metal and immersed in water, for example. The reduction rate in elongation is preferably 25% or less, more preferably 20% or less.

The film to be laminated on a metal of the present invention is a film which is formed of the above polycarbonate resin and has a thickness of 5 to 100 µm. If the film thickness is below 5 µm, defects such as pinholes or cracks is liable to occur in the film when it is laminated on a metal plate. On the other hand, if the film thickness is above 100 µm, moldability deteriorates and it is economically disadvantageous. The film to be laminated on a metal, provided by the present invention, is preferably 5 to 80 µm in thickness, more preferably 10 to 60 µm, the most preferably 15 to 40 µm.

According to a preferred aspect of the present invention, the polycarbonate resin constituting the film of the present invention contains a polyepoxy compound.

As the polyepoxy compound, a compound containing two or more epoxy groups in the molecule is preferably used.

Preferred examples of the polyepoxy compound include the following compounds:

(1) glycidyl ether-based compounds including aromatic polyols such as 2,2-bis(4-hydroxyphenyl)propane (bisphenol A), 1,1-bis(4-hydroxyphenyl)ethane, 1,1-bis(4-hydroxyphenyl)cyclohexane, 4,4'-dihydroxydiphenyl methane, 4,4'-dihydroxydiphenyl ether, 4,4'-dihydroxydiphenyl sulfone, resorcinol, phenol novolak, cresol novolak and naphthol novolak; polyols obtained by a dehydrocondensation reaction between an aromatic hydroxy compound such as phenol and naphthol and an aldehyde such as glyoxal, glutaraldehyde, benzaldehyde, and p-hydroxybenzaldehyde in the presence of an acid catalyst; and glycidyl ethers of polyols including polyhydric alcohols such as butanediol, neopentylene glycol, glycerol, polyethylene glycol and polypropylene glycol;

(2) glycidyl ester-based compounds including glycidyl esters of polycarboxylic acid such as phthalic acid, isophthalic acid, naphthalene dicarboxylic acid and trimellitic acid;

(3) N-glycidyl-based compounds including compounds prepared by substituting active hydrogen coupled to the nitrogen atom of nitrogen-containing compounds such as aniline, isocyanuric acid, and 4,4'-diaminodiphenyl methane;

(4) glycidyl ether ester-based compounds including glycidyl ether esters of hydroxycarboxylic acids such as p-hydroxybenzoic acid and hydroxynaphthoic acid; and (5) epoxy resins obtained from unsaturated alicyclic compounds such as cyclopentadiene and dicyclopentadiene, triglycidyl compounds of p-aminophenol, vinylcyclohexene dioxide, and the like.

These polyepoxy compounds may be used alone or in a combination of two or more. Among these polyepoxy compounds, polyepoxy compounds such as diglycidyl ethers of 2,2-bis(4-hydroxyphenyl)propane(bisphenol A) are preferably used.

These polyepoxy compounds are preferably used in an amount of 0.1 to 5 parts by weight, more preferably 0.2 to 4 parts by weight, particularly preferably 0.3 to 3 parts by weight based on 100 parts by weight of the polycarbonate resin.

When the amount of the polyepoxy compound is less than 0.1 part by weight based on 100 parts by weight of the polycarbonate resin, an adhesion improving effect obtained by addition of the polyepoxy compound is unsatisfactory, whereas, when the polyepoxy compound is contained in an amount of more than 5 parts by weight, heat resistance and other mechanical properties of the polycarbonate is liable to be lost, which is not preferred.

The film of the present invention can be produced by a known film formation process of the prior art in which the above polycarbonate resin is melt extruded from a slit nozzle of a T die and taken up through a casting roller. To incorporate the above polyepoxy compound, the polycarbonate and the polyepoxy compound are preliminarily melt blended before the film forming. However, a process in which the polycarbonate resin and the polyepoxy resin are blended to directly produce a film is preferred from a view point of productivity.

Additives such as an anti-oxidant, a heat stabilizer, an ultraviolet absorber, a plasticizer, inorganic particle, organic particle, an antistatic agent and the like may be dispersed or blended in the polycarbonate of the present invention, as required.

It is particularly recommended that the film of the present invention contain 0.1 to 1 part by weight of fine particles having an average particle diameter of 2.5 µm or less based on 100 parts by weight of the polycarbonate resin in order to improve handling property (winding property) in the film production process as described above.

A lubricant may be of an inorganic or organic type, while an inorganic lubricant is preferred. Specific examples of the inorganic lubricant include silica, alumina, titanium dioxide, calcium carbonate, barium sulfate and the like, whereas specific examples of the organic lubricant include crosslinked polystyrene particles, silicone particles and the like. It is preferred that both inorganic and organic lubricants have an average particle diameter of 2.5 µm or less. If the average particle diameter of the lubricant is above 2.5 µm, pinholes generate, starting from a coase lubricant particle (e.g., a particle of more than 10 µm) of a portion deformed by molding processing, or rupture will result in some cases.

Particularly, a lubricant preferred in terms of pinhole resistance is a monodisperse lubricant having an average particle diameter of 2.5 µm or less and a particle diameter ratio (long diameter/short diameter) of 1.0 to 1.2. Examples of such a lubricant include spherical silica, spherical titanium oxide, spherical zirconium, spherical silicone particles and the like.

The polycarbonate film to be laminated on a metal of the present invention exhibits such excellent resistance to impact after a lapse of time that it shows only a current value of 0.1 mA or less when it is laminated on a steel plate, impact is given on the resulting laminate, and electricity is applied to the laminate (impact resistance test). Such a film is suitably used for a metal container which is produced by subjecting to drawing fabrication.

According to the present invention, there is also provided another film which is formed of a resin composition comprising a polycarbonate resin and a specific polyester resin and exhibits the same performance as the above-mentioned film of the present invention.

That is, according to the present invention, secondly, there is provided a film to be laminated on a metal (to be referred to as "second film of the present invention" hereinafter), (A') which is formed of a resin composition comprising (a) a polycarbonate which consists essentially of a recurring unit represented by the above formula (1) and (b) a polyester resin in which at least 70 mol % of a dicarboxylic acid component is a terephthalic acid residue and/or an isophthalic acid residue and at least 70 mol % of a diol component is an ethylene glycol residue and/or a tetramethylene glycol residue, the amount of the polycarbonate resin being 50 to 99% by weight and that of the polyester resin being 1 to 50% by weight based on the total weight of the polycarbonate resin and the polyester resin, (B) which has a reduction rate of elongation after 24 hours of immersion in water heated at 50° C. of 30% or less, and (C) which has a thickness of 5 to 100 μm.

The second film of the present invention is formed of a resin composition (A') comprising the polycarbonate resin (a) and the polyester resin (b).

The same examples of the polycarbonate resin (a) as those described above may be used.

Among these, the preferred are the one which contains the terminal OH groups in an amount of at least 20 eg/$10^6$ g and has a viscosity-average molecular weight of 10,000 to 40,000 as the polycarbonate resin used in the second film. Among these, especially preferred are polycarbonate resins which satisfy the following expressions (4) and (5):

$$15{,}000 \leq Mv \leq 40{,}000 \qquad (4)$$

$$Mv \geq \frac{20{,}000}{[OH]-15} + 13{,}000 \qquad (5)$$

wherein Mv is a viscosity-average molecular weight of the polycarbonate resin (a) and [OH] is a terminal OH group amount of the polycarbonate resin (a) (eg/$10^6$ g).

As the polyester resin (b), a polyester in which at least 70 mol % of an acid component is a terephthalic acid residue and/or an isophthalic acid residue and at least 70 mol % of a diol component is an ethylene glycol residue and/or a tetramethylene glycol residue.

Preferably, at least 80 mol % of the acid component, more preferably at least 90 mol % of the acid component, is a terephthalic acid residue and/or an isophthalic acid residue. The proportion of the terephthalic acid residue and the isophthalic acid residue (number of moles of the terephthalic acid residue/number of moles of the terephthalic acid residue+number of moles of the isophthalic acid residue) is preferably at least 0.5, more preferably at least 0.6, particularly preferably at least 0.7. Acid components other than terephthalic acid and isophthalic acid are not particularly limited as far as they are divalent carboxylic acid. Examples thereof include residues of 2,6-naphthalene dicarboxylic acid, 4,4'-biphenyl dicarboxylic acid, sebacic acid, adipic acid and the like.

Preferably, at least 80 mol % of the diol component is an ethylene glycol residue and/or a tetramethylene glycol residue, and more preferably at least 90 mol % is an ethylene glycol residue and/or a tetramethylene glycol residue. The proportion of ethylene glycol and tetramethylene glycol is not particularly limited, and each of them is also preferably used alone. Diol components other than the ethylene glycol residue and the tetramethylene glycol residue are not particularly limited, and preferred examples thereof are residues of hexamethylene glycol, neopentylene glycol, diethylene glycol, cyclohexanedimethanol and the like.

These polyester resins (b) may be produced by the known melt polymerization process of the prior art. Preferred examples of the polyester resin include polyethylene terephthalate, polytetramethylene terephthalate, poly(ethylene/tetramethylene)terephthalate copolymer, polyethylene(terephthalate/isophthalate)copolymer and the like.

The polyester resin (b) is preferably produced using a germanium compound and/or a titanium compound as a catalyst. Such a polyester resin (b) is excellent in film formation stability when it is melt mixed with the polycarbonate resin to produce a film.

The polyester resin (b) described above preferably has a intrinsic viscosity of 0.3 to 1.2, more preferably 0.4 to 1.0, when measured at 35° C. in a phenol/1,1,2,2-tetrachloroethane mixed solvent (weight ratio of 60/40).

In the present invention, as for the blend proportion of the polycarbonate resin (a) and the polyester resin (b), the polycarbonate resin occupies 50 to 99% by weight and the polyester resin occupies 1 to 50% by weight.

The proportion of the polycarbonate resin (a) is preferably 60 to 98% by weight, more preferably 70 to 97% by weight, particularly preferably 80 to 96% by weight.

The blending method of these resins is not particularly limited, and known melt blending methods of the prior art can be suitably applied such as a method in which dry blended polymer chips are melt kneaded and extruded with a melt extruder, a method in which either one of the polymers is separately and quantitatively fed with a side feeder or the like, melt kneaded and extruded.

The temperature for melt blending is not particularly limited, and ranges preferably from 240° to 330° C., more preferably from 260° to 310° C. The time for melt blending depends on the polymer composition or blending temperature, but ranges preferably from about 30 seconds to 30 minutes, more preferably from about 1 to 20 minutes.

A stabilizer or the like is preferably added in a suitable amount as required at the time of blending. Preferred examples of the stabilizer include phosphoric compounds such as phosphoric acid, ester phosphate, phosphorous acid, ester phosphite and the like. The stabilizer has functions to inactivate or deactivate a catalyst for the polymerization of polyester and/or polycarbonate and suppress a reaction between the polyester and the polycarbonate. The stabilizer, when used, is preferably used in an amount of 0.001 to 0.1 mol % with respect to the polyester resin used. This stabilizer may be added simultaneously with melt blending of the polymer or blended with the polyester or the polycarbonate in advance.

The resin composition (A') may contain fine particles as a polyepoxy compound or a lubricant.

The same examples of the polyepoxy compound as those described above may be used, and its amount ranges preferably from 0.1 to 5 parts by weight, more preferably from 0.2 to 4 parts by weight, particularly preferably from 0.3 to 3 parts by weight, based on 100 parts by weight of the resin composition (A').

The same examples of the fine particle having an average particle diameter of 2.5 μm or less as those described above may be used in an amount of 0.01 to 1 part by weight based on 100 parts by weight of the resin composition (A').

The resin composition (A') has the terminal OH groups of the polycarbonate resin (a) and the terminal OH groups and COOH groups of the polyester resin (b). The total amount of these terminal OH groups and the terminal COOH groups of the resin composition (A') is preferably at least 25 eq/$10^6$ g, more preferably at least 30 eq/$10^6$ g, particularly preferably at least 40 to 200 eq/$10^6$ g.

The above second film needs to have a reduction rate of elongation after 24 hours of immersion in water heated at 50° C. of 30% or less. A preferred reduction rate of elongation is 25% or less, more preferably 20% or less.

The thickness of the second film ranges from 5 to 100 μm, preferably from 5 to 80 μm, more preferably from 10 to 60 μm, particularly preferably from 15 to 40 μm.

Reasons for specifying the reduction rate of elongation and the film thickness are the same as described above.

The second film of the present invention may be produced by replacing the polycarbonate resin with the resin composition (A') in the above film production method.

The second film of the present invention exhibits only a current value of 0.1 mA or less when it is laminated preferably on a steel plate, impact is given to the resulting laminate, and electricity is applied to the laminate (impact resistance test).

By the way, it is known that polyester has insufficient moldability especially when it is processed into a biaxially oriented film and that blanching (generation of fine cracks) or rupture is liable to occur in a film by drawing fabricating, for example. However, researches conducted by the inventors of the present invention reveal that, when a polyester resin is mixed with a polycarbonate resin, the above-mentioned defects can be overcome even if the blending proportion of the polycarbonate resin is small.

That is, according to the invention, thirdly, there is provided a film to be laminated on a metal (to be referred to as "third film of the present invention" hereinafter) (A") which is formed of a resin composition comprising (a) a polycarbonate resin which consists essentially of a recurring unit represented by the above formula (1) and (b) the same polyester resin as that used in the above second film, the amount of the polycarbonate resin being 1 to 50% by weight and that of the polyester resin being 50 to 99% by weight based on the total weight of the polycarbonate resin and the polyester resin, (B) which exhibits only a current value of 0.1 mA or less when it is laminated on a steel plate, impact is given to the resulting laminate, and electricity is applied to the laminate (impact resistance test); and (C) which has a thickness of 5 to 100 μm.

The third film of the present invention is formed of a resin composition (A") comprising the polycarbonate resin (a) and the polyester resin (b) like the second film.

As the polycarbonate resin (a) and the polyester resin (b), the same compounds as those described above may be used.

Among these, polyester resins which are produced using a catalyst such as a germanium compound and/or a titanium compound are preferred as the polyester resin (b) used in the third film. Also, those having a glass transition point of 50° C. or more and a melting point of more than 200° C. are preferred.

Preferred examples of the polyester resin include polyethylene terephthalate, poly(ethylene/tetramethylene)-terephthalate copolymer, polyethylene(terephthalate/isophthalate) copolymer and the like, which may be used alone or in an admixture of two or more.

Among these polyester resins, particularly preferred are polyethylene terephthalate, copolyethylene terephthalate containing 20 mol % or less of isophthalic acid as a comonomer, and a composition comprising 70% or more by weight of polyethylene terephthalate and 30% or less by weight of polytetramethylene terephthalate.

Preferably, the above polyester resins have an intrinsic viscosity of 0.3 to 1.5 when measured at 35° C. in a phenol/1,1,2,2-tetrachloroethane mixed solvent (weight ratio: 60/40). Below 0.3, mechanical properties are insufficient as a polymer, whereas, above 1.5, it is difficult to handle it, which is not preferred. The intrinsic viscosity is more preferably from 0.4 to 1.2, particularly preferably from 0.5 to 1.0.

In the present invention, as for the mixing proportion of the polyester resin and the polycarbonate resin, the polyester resin occupies 50 to 99% by weight and the polycarbonate resin occupies 1 to 50% by weight based on the total weight of the two resins. If the proportion of the polyester resin is above 99% by weight, impact resistance may be insufficient.

The proportion of the polycarbonate resin is preferably 2 to 40% by weight, more preferably 5 to 35% by weight, particularly preferably 10 to 30% by weight.

The same mixing method and the same mixing conditions of these resins as those used for the second film are employed.

The resin composition (A") may contain a polyepoxy compound and fine particles as a lubricant.

As the polyepoxy compound, the same examples as described above may be used, and its amount is preferably in the range of 0.1 to 5 parts by weight, more preferably 0.2 to 4 parts by weight, the most preferably 0.3 to 3 parts by weight based on 100 parts by weight of the resin composition (A").

As the fine particles, the same examples as those described above having an average particle diameter of 2.5 μm or less may be used in an amount of 0.01 to 1 part by weight based on 100 parts by weight of the resin composition (A").

The resin composition (A") has the terminal OH groups of the polycarbonate resin (a) and the terminal OH and COOH groups of the polyester resin (b). The total amount of these terminal OH and COOH groups of the resin composition (A") is preferably at least 25 eq/$10^6$ g, more preferably at least 30 eq/$10^6$ g, particularly preferably 4 to 200 eq/$10^6$ g.

The thickness of the third film ranges from 5 to 100 μm, preferably from 5 to 80 μm, more preferably from 10 to 60 μm, the most preferably from 15 to 40 μm.

Reasons for specifying the reduction rate of elongation and the film thickness are the same as described above.

The third film of the invention can be produced by replacing the polycarbonate resin with the resin composition (A') in the above film production method.

Furthermore, the third film of the invention can be used in an unstretched state, but can be further monoaxially or biaxially oriented. Particularly, it is suitable for use as a biaxially oriented film.

The stretch ratio for biaxial orientation is preferably at least 5 times, more preferably at least 6 times, particularly preferably at least 7 times as an area stretch ratio. The upper limit of the area stretch ratio is not particularly limited, but is actually approximately 20 times or less. The stretch ratios for biaxial orientation in the machine axial direction and in the direction perpendicular thereto are not particularly limited, but are preferably about the same stretch ratios to eliminate anisotropy specific to the thus obtained film.

As an orientation method, known conventional methods such as simultaneous biaxial orientation and consecutive biaxial orientation may be applied. Orientation temperature varies depending upon the types of a polyester resin and a polycarbonate resin used, blend composition, film thickness before orientation and the like, but it is preferably in the range of 80° to 160° C. In the case of consecutive biaxial orientation, second orientation temperature is preferably at least 5° C. higher, more preferably at least 10° C. higher, than first orientation temperature. The stretched film obtained by the above method may be subjected to thermosetting as required. Thermosetting temperature is preferably at least 10° C. higher, more preferably at least 20° C. higher, than the last orientation temperature. Thermosetting may be effected under any one of such conditions as fixed length, tension and restricted shrinkage.

The thus obtained stretched film preferably has a refractive index of 1.505 to 1.550 in the film thickness direction.

When the third film of the present invention is preferably laminated on a steel plate, impact is given to the resulting laminate, and electricity is applied to the laminate (impact resistance test), it shows only a current value of 0.1 mA or less.

The third film of the present invention preferably has a reduction rate of elongation after 24 hours of immersion in water heated at 50° C. of 30% or less so as to achieve excellent age resistance to impact when it is laminated on a metal and immersed in water.

According to the present invention, there is provided a laminate film as a film to be laminated on a metal which can attain the above-mentioned object of the present invention.

Therefore, according to the present invention, fourthly, there is provided (A") a laminate film to be laminated on a metal which consists of (A1) a first layer of a polyester resin having a melting point of more than 200° C. and (A2) a second layer of a polycarbonate resin which consists essentially of a recurring unit represented by the above formula (1) or a resin composition comprising a polyester resin having a melting point of more than 200° C. and a polycarbonate resin which consists essentially of a recurring unit represented by the above formula (1), the polycarbonate resin contained in the resin composition occupying at least 1% by weight based on the total weight of the polyester resin and the polycarbonate resin; which exhibits only a current value of 0.1 mA or less when it is laminated on a steel plate, impact is given to the resulting laminate, and electricity is applied to the laminate (impact resistance test); and which has a total thickness of 5 to 100 μm.

The multi-layer film of the present invention consists of the first layer (A1) of the polyester resin having a melting point of more than 200° C. and the second layer (A2). The second layer (A2) is formed of a polycarbonate resin which consists essentially of a recurring unit represented by the above formula (1) or a resin composition comprising a polyester resin having a melting point of more than 20° C. and a polycarbonate resin which consists essentially of a recurring unit represented by the above formula (1).

A preferred example of the polyester resin having a melting point of more than 200° C. is a polyester resin in which at least 70 mol % of a dicarboxylic acid component is terephthalic acid and/or isophthalic acid and at least 70 mol % of a diol component is ethylene glycol and/or tetramethylene glycol.

The same examples as those provided for the second film of the present invention may be used as the polyester resin.

Also, the same examples as those described above may be used as the polycarbonate resin.

The multi-layer film of the present invention may be used in such a manner that either the first layer or the second layer is in contact with a metal.

When the second layer is made of a polycarbonate resin and the laminate film is laminated on a metal in such a manner that the second layer is in contact with the metal, the polycarbonate resin preferably contains terminal OH groups in an amount of at least 20 eg/$10^6$ g and has a viscosity-average molecular weight of 10,000 to 40,000.

When the second layer is formed of a resin composition comprising a polyester resin and a polycarbonate resin in which the polycarbonate resin accounts for 50 to 99% by weight of the total weight of these resins, and is in contact with a metal, the total amount of the terminal OH and COOH groups of the resin composition is preferably at least 25 eg/$10^6$ g.

Likewise, when the second layer is formed of a resin composition comprising a polyester resin and a polycarbonate resin in which the amount of the polycarbonate resin is 1 to 50% by weight based on the total amount of these resins, and is in contact with a metal, the total amount of the terminal OH and COOH groups of the resin composition is preferably at least 25 eg/$10^6$ g.

When the second layer is formed of a resin composition comprising a polyester resin and a polycarbonate resin, polyesters produced using a germanium compound and/or a titanium compound as a catalyst are preferably used as the polyester.

A polyepoxy compound may be contained in the second layer in an amount of 0.1 to 5 parts by weight based on 100 parts by weight of the polycarbonate resin or the resin composition constituting the second layer (A2).

In this case, the same examples as those described above may be used as the polyepoxy compound.

It is preferable that the first layer of the polyester resin constitutes the surface layer when the laminate film of the present invention is laminated on a metal.

In this case, the polyester resin forming the first layer (A1) may contain fine particles having an average particle diameter of 2.5 μm or less in an amount of 0.01 to 1 part by weight based on 100 parts by weight of the resin. The same examples as those described above may be used as the fine particle having an average particle diameter of 2.5 μm or less.

Inclusion of the fine particle improves surface smoothness as described above.

The multi-layer film of the present invention may consist of three layers. In this case, there is a third layer (A3) besides first and second layers (A1 and A2). The first layer (A1), the second layer (A2), and the third layer (A3) are preferably placed one upon another in this order with the second layer (A2) being interposed between the other two as an intermediate layer. The third layer (A3) is preferably formed of polyethylene terephthalate, copolyethylene terephthalate having a melting point of more than 200° C., polybutylene terephthalate, or a blend of these polyesters.

The multi-layer film of the present invention has a total thickness of 5 to 100 μm.

When the multi-layer film is formed of two layers A1 and A2, the first layer (A1) preferably has a thickness of 0.03 to 0.97, more preferably 0.05 to 0.95, particularly preferably 0.1 to 0.9, when the total thickness of the multi-layer film is 1.

When the multi-layer film is formed of three layers, the first layer (A1), the second layer (A2), and the third layer (A3) preferably have each a thickness in the range of 1 to 40 μm.

The laminate film of the present invention can be produced by the following methods: one in which resins for forming respective layers are separately molten, co-extruded, laminated and fused together before solidification, and then the resulting laminate is biaxially oriented and thermally set as required, and one in which resins for forming respective layers are molten separately, extruded, oriented if necessary, and laminated together. A laminate film consisting of three layers may be produced by a method in which a double-layer laminate film is first produced by co-extrusion and then laminated with another film of the third layer.

Furthermore, the polycarbonate resin layer may be formed by dissolving a polycarbonate resin in an organic solvent and applying the resulting solution to a polyester resin film.

In the laminate film of the present invention, the first layer of the polyester resin is preferably biaxially oriented.

As the metal plate to be laminated with the film of the present invention, tin-plated steel plate, tin-free steel plate and aluminum plate are suitable. The film may be laminated on the metal plate by the following methods (1) and (2):

(1) The metal plate is heated at a temperature higher than the softening point of the film, and the film is laminated on the metal plate and then cooled to adhere the film to the metal plate; and (2) An adhesive layer is primer coated on the film in advance and the film is laminated on the metal plate with the coated surface being in contact with the metal plate.

As the adhesive layer, known resin adhesives such as epoxy-based adhesives, epoxy-ester-based adhesives, alkyd-based adhesives and the like may be used.

The following examples are provided to further illustrate the present invention. It is to be understood, however, that the examples are for purpose of illustration only and are not intended as a definition of the limits of the present invention. The term "part" in the examples means "part by weight".

(i) The viscosity-average molecular weight (Mv) of polycarbonate was calculated from an intrinsic viscosity ([η]) measured in a methylene chloride solution, using the following Schnell expression:

$$\log Mv = \frac{1}{0.83} \log \frac{[\eta]}{1.23 \times 10^{-4}}$$

(ii) The amount of the terminal OH groups of the polycarbonate was determined by measuring color development caused by interaction between $TiCl_4$ and the terminal OH group (see Die Makromol. Chem. vol.88, pp.215, 1965).

(iii) The terminal groups of the resin composition comprising a polycarbonate and a polyester was measured as follows.

The aromatic terminal OH group was measured in a solvent of hexafluoro-2-propanol-d using H-NMR.

The aliphatic terminal OH group was measured in a solvent mixture of phenol-$d_6$ and chloroform-$d_1$ (3:2) using H-NMR.

The terminal COOH group was tiltrated in a solvent mixture of phenol and tetrachloroethane (2:3) with a NaOH benzyl alcohol solution using tetrabromophenol blue as an indicator.

(iv) The reduction rate of elongation of the film was calculated from the following equation by immersing the film in water heated at 50° C. for 24 hours and obtaining elongations before and after immersion:

film elongation reduction rate (%) =

$$\frac{\text{elongation before immersion} - \text{elongation after immersion}}{\text{elongation before immersion}} \times 100$$

(v) peel strength

A single film was sandwiched between two steel plates which were subjected to electrolytic treatment with chromic acid and had a thickness of 210 μm and was applied by a pressure of 20 kg/cm² with a hot press heated at 285° C. for 30 seconds to be laminated with the steel plates. The resulting laminate plate was cut into a test sample having a width of 10 mm and a length of 50 mm. This test sample was coated with a release agent on a 20 mm portion at one end so that the laminate plate can be easily removed.

The two steel plates were removed from the 20 mm portion of the test sample which was coated with the release agent in opposite directions to form a T shape and both ends of the removed steel plates were fixed with a tensile tester to measure the peel strength of the test sample at a tensile rate of 20 mm/min. (according to JIS K 6854).

In the case of a multi-layer film which includes top and rear surfaces of different resins, two of the same multi-layer films were stacked together with a resin layer to be measured for its peel strength being the outer side of the film (to be in contact with the metal plate) and the resulting laminate was laminated on a steel plate for evaluation.

(vi) Melting point (Tm) and glass transition temperature (Tg) were measured according to DSC.

(vii) resistance to impact after a lapse of time

A laminate plate was produced using a single film and a single steel plate in the same manner as described in (v). After production, the laminate plate was retained in water heated at 50° C. for 24 hours. Thereafter, an impact deformation test was conducted on this laminate plate according to the method described in JIS K 5400. That is, a striking mold having a curvature radius of 5 mm was set on the top of the laminate plate where the film was not laminated, and a weight having a mass of 200 g was gravity dropped over the striking mold from a height of 20 cm. At this time, a rubber plate of 5 mm in thickness was placed under the laminate plate.

After subjecting to this impact deformation test, one electrode is connected to the metal side of the laminate plate where the film was not laminated, and cotton impregnated with 1% saline water was placed at a position (convex portion) of the other film side of the laminate plate where the weight was dropped over, and connected to the other electrode. A voltage of 6V was applied to these electrodes to measure a current value. The smaller the current value (mA), the better the resistance to impact after a lapse of time is.

EXAMPLES 1 TO 3 AND COMPARATIVE EXAMPLE 1

50 parts of a bisphenol A polycarbonate resin having an Mv of 25,000 and a terminal OH group amount of 15 eq/10⁶ g was charged into a reactor equipped with a stirrer and a nitrogen introduction port and molten at 290° C. under normal pressure in a nitrogen gas stream. To this molten polymer was added 0.005 part of sodium salt of bisphenol A and a predetermined amount of bisphenol A, and they were melt mixed for 15 minutes to perform a reaction.

The thus obtained polymer was extruded from a T die having a slit thickness of 0.1 mm and a width of 30 mm of a 30 mmφ monoaxial extruder under such conditions as a polymer temperature of 290° C. and an average residence time of approximately 10 minutes, and the resulting film was taken up through a casting roller heated at 80° C. to produce a film of approximately 30 μm in thickness. Properties of the thus obtained film such as Mv and the terminal OH group amount (mole/10⁶ g) are shown in Table 1. A film formed of a bisphenol A polycarbonate resin having an Mv of 25,000 and a terminal OH group amount of 15 eq/10⁶ g is shown as a comparative example.

TABLE 1

|  | Ex. 1 | Ex. 2 | Ex. 3 | Comp. Ex. 1 |
|---|---|---|---|---|
| Amount of bisphenol A (part) | 0.45 | 0.7 | 0.9 | — |
| Mv | 20,300 | 18,500 | 16,700 | 23,500 |
| Terminal OH group amount (eq/10⁶ g) | 54 | 76 | 95 | 15 |
| Peel strength (kg/cm) | 1.3 | 1.7 | 2.0 | 0.5 |
| Reduction rate of film elongation (%) | −5.9 | 11.7 | 7.9 | 4.6 |
| Film elongation before immersion in water (%) | 85 | 60 | 38 | 130 |
| Film elongation after immersion in water (%) | 90 | 53 | 35 | 124 |
| Resistance to impact after lapse of time (mA) | 0 | 0 | 0 | 0 |

EXAMPLE 4

214 parts of diphenyl carbonate, 239 parts of bisphenol A, and 0.02 part of sodium salt of bisphenol A were charged into a reactor equipped with a stirrer, a nitrogen gas introduction port and a vacuum distillation system and were allowed to react at 20° C. under normal pressure in a nitrogen gas stream for 30 minutes and then at 260° C. for 30 minutes. Thereafter, the reactor was depressurized to approximately 100 mmHg over 15 minutes. After 30 minutes of the reaction under this condition, the temperature was elevated to 290° C. for 15 minutes to continue the reaction. The reaction was further carried out at this temperature at a reduced pressure of 20 mmHg for 15 minutes and then at a reduced pressure of 0.5 mmHg for 60 minutes.

A film of approximately 30 μm in thickness was produced from the thus obtained polymer in the same manner as in Example 1. The film had an Mv of 19,000 and a terminal OH group amount of 92 eq/10⁶ g. This film was laminated on a steel plate in the same manner as in Example 1. The film had a peel strength of 2.5 kg/cm. The film was immersed directly in water heated at 50° C. and measured for its elongation. Elongation before immersion was 80% and elongation after immersion was 72% (reduction rate in elongation of 10%). Resistance to impact after a lapse of time was 0 mA.

EXAMPLES 5 TO 7

100 parts of a bisphenol A polycarbonate resin having an Mv of 25,000 and a terminal OH group amount of 10 eq/10⁶ g was charged into a reactor equipped with a stirrer, a nitrogen gas introduction port and a vacuum distillation system, and molten at 290° C. under normal pressure in a nitrogen gas stream. To this molten polymer were added 0.008 part of sodium salt of bisphenol A and a predetermined amount of bisphenol A, and they were melt mixed to perform a reaction. The polymer was reacted with the components at the same temperature at a reduced pressure of 0.1 mmHg for a certain time.

The thus obtained polymer was melt kneaded using a 30 mmφ unidirectionally rotating biaxial extruder (PCM30, manufactured by Ikegai Corporation), under such conditions as a polymer temperature of 290° C. and an average residence time of approximately 15 minutes. The resulting mixture was extruded from a T die having a slit thickness of 0.1 mm and a width of 300 mm, attached to the end of the extruder. The resulting film was taken up through a casting roller heated at 80° C. to produce a film of approximately 30 μm in thickness. The properties of the thus obtained film such as Mv and terminal OH group amount (eq/10⁶ g) are shown in Table 2.

TABLE 2

|  | Ex. 5 | Ex. 6 | Ex. 7 |
|---|---|---|---|
| Amount of bisphenol A (part) | 0.45 | 0.9 | 0.9 |
| Reaction time at reduced pressure (min.) | 0 | 15 | 30 |
| Mv | 22,000 | 25,000 | 30,000 |
| Terminal OH group amount (eq/10⁶ g) | 30 | 40 | 40 |
| Peel strength (kg/cm) | 3.0 | 3.0 | 4.0 |
| Reduction rate of film elongation (%) | 16.7 | 7.1 | 6.7 |
| Film elongation before immersion in water (%) | 120 | 140 | 150 |
| Film elongation after immersion in water (%) | 100 | 130 | 140 |
| Resistance to impact after lapse of time (mA) | 0 | 0 | 0 |

EXAMPLES 8 TO 10

100 parts of a bisphenol A polycarbonate resin having such a viscosity-average molecular weight and terminal OH group amount as shown in Table 3 was charged into a reactor equipped with a stirrer and a nitrogen introduction port, and molten at 290° C. under normal pressure in a nitrogen gas stream. To this molten polymer was added a predetermined amount of a polyepoxy compound (Epikote 828, manufactured by Yuka Shell Epoxy K.K.) shown in Table 3, and they were melt mixed for 15 minutes.

The thus obtained polycarbonate composition was melt kneaded using a 30 mmφ unidirectionally rotating biaxial extruder (PCM30, manufactured by Ikegai Corporation) under such conditions as a polymer temperature of 290° C. and an average residence time of approximately 15 minutes. The resulting mixture was extruded from a T die having a width of 300 mm and a slit thickness of 0.1 mm, attached to the end of the extruder. The resulting film was taken up through a casting roller heated at 80° C. to produce a transparent film of approximately 30 μm in thickness.

The properties of the thus obtained film are shown in Table 3.

TABLE 3

|  | Ex. 8 | Ex. 9 | Ex. 10 |
|---|---|---|---|
| Mv | 18,000 | 18,000 | 23,000 |
| Terminal OH group amount (eq/10⁶ g) | 40 | 40 | 35 |
| Amount of polyepoxy compound (parts) | 1.0 | 2.0 | 1.0 |
| Peel strength (kg/cm) | 4.0 | 4.5 | 6.0 |
| Reduction rate of film elongation (%) | 20.0 | 11.1 | 7.1 |
| Film elongation before immersion in water (%) | 100 | 90 | 140 |
| Film elongation after immersion in water (%) | 80 | 80 | 130 |

TABLE 3-continued

|  | Ex. 8 | Ex. 9 | Ex. 10 |
|---|---|---|---|
| Resistance to impact after lapse of time (mA) | 0 | 0 | 0 |

EXAMPLES 11 TO 13

50 parts of a bisphenol A polycarbonate resin having an MV of 25,000 and a terminal OH group amount of 20 eq/$10^6$ g was charged into a reactor equipped with a stirrer and a nitrogen introduction port, and molten at 290° C. under normal pressure in a nitrogen gas stream. To this molten polymer was added a predetermined amount of 1,10-decane diol, and they were melt mixed for 15 minutes to perform a reaction.

The thus obtained polymer was melt kneaded using a mmφ uniaxial extruder under such conditions as a polymer temperature of 290° C. and an average residence time of approximately 10 minutes and extruded from a T 30 die having a width of 30 mm and a slit thickness of 0.1 mm. The resulting film was taken up through a casting roller heated at 80° C. to produce a film of approximately 30 μm in thickness. The properties of the thus obtained film are shown in Table 4.

TABLE 4

|  | Ex. 11 | Ex. 12 | Ex. 13 |
|---|---|---|---|
| Amount of 1,10-decanediol (parts) | 0.35 | 0.70 | 1.0 |
| Mv | 21,500 | 20,200 | 18,000 |
| Terminal OH group amount (eq/$10^6$ g) | 51 | 58 | 78 |
| Peel strength (kg/cm) | 1.2 | 1.5 | 1.8 |
| Reduction rate of film elongation (%) | 9.1 | 11.1 | 13.8 |
| Film elongation before immersion in water (%) | 110 | 90 | 65 |
| Film elongation after immersion in water (%) | 100 | 80 | 56 |
| Resistance to impact after lapse of time mA | 0 | 0 | 0 |

EXAMPLES 14 AND 15

The procedure of Examples 11 to 13 was repeated except 1,4-cyclohexanedimethanol was used in place of 1,10-decane diol. The properties of the thus obtained film such as Mv, terminal OH group amount, peel strength and film elongation are shown in Table 5.

TABLE 5

|  | Ex. 14 | Ex. 15 |
|---|---|---|
| Amount of 1,4-cyclohexane dimethanol (parts) | 0.64 | 1.0 |
| Mv | 21,000 | 19,000 |
| Terminal OH group amount (eq/$10^6$ g) | 53 | 65 |
| Peel strength (kg/cm) | 1.2 | 1.6 |
| Reduction rate of film elongation (%) | 6.7 | 13.3 |
| Film elongation before immersion in water (%) | 105 | 75 |
| Film elongation after immersion in water (%) | 98 | 65 |
| Resistance to impact after lapse of time mA | 0 | 0 |

It is understood from the results of Examples 1 to 15 and Comparative Example 1 as described above that adhesion force between a metal plate and a polycarbonate film is related to the terminal OH group amount and the viscosity-average molecular weight of the polycarbonate and that the film of the present invention has high adhesion force. Furthermore, the film which has been immersed in water heated at 50° C. has no much change in elongation and has good resistance to impact after a lapse of time, which is possessed by the polycarbonate.

EXAMPLE 16

100 parts of 2,2-bis(4-hydroxyphenyl)propane, 84.5 parts of 48% sodium hydroxide aqueous solution, and 661 parts of distilled water were charged into a reactor equipped with a stirrer, and dissolved. To the solution was added 330 parts of methylene chloride, the solution mixture was cooled to 20° C., and 49.8 parts of phosgene was blown into the reactor over 40 minutes. Thereafter, to the reaction mixture was added a solution of 2.8 parts of 4-(2-hydroxyethyl)phenol in methylene chloride, followed by addition of 12.4 parts of 48% sodium hydroxide aqueous solution and 0.15 part of triethylamine. The mixture was stirred for 2 hours. After completion of a reaction, a methylene chloride solution of a polycarbonate in a lower layer was separated from the reaction solution and washed with a hydrochloric acid aqueous solution and distilled water, and then methylene chloride was removed by evaporation to obtain a polycarbonate. The thus obtained polycarbonate had a viscosity-average molecular weight of 21,000 and a terminal OH group amount of 168 eq/$10^6$ g.

The thus obtained polycarbonate was measured for its $^1$H-NMR (using FX-90Q, manufactured by Nippon Denshi K.K.) using CDCl$_3$ as a solvent and tetramethyl silane as an internal standard. A proton signal of a methylene group adjacent to a hydroxyl group was observed at δ3.7 ppm and it was confirmed that a terminal group was introduced from 4-(2-hydroxyethyl)phenol.

The above-mentioned polycarbonate resin was melt kneaded using a 30 mmφ unidirectionally rotating biaxial extruder (PCM30, manufactured by Ikegai Corporation) under such conditions as a polymer temperature of 290° C. and an average residence time of approximately 15 minutes and extruded from a T die having a width of 300 mm and a slit thickness of 0.1 mm, attached to the end of the extruder. The resulting film was taken up through a casting roller heated at 80° C. to produce a film of approximately 30 μm in thickness. The properties of the thus obtained film are shown in Table 6.

EXAMPLE 17

Polymerization was carried out in the same manner as in Example 16 except that 2.6 parts of 4-(2-hydroxyethoxy) phenol was used in place of 2.8 parts of 4-(2-hydroxyethyl) phenol as an endcapping agent to obtain a polycarbonate. The thus obtained polycarbonate had a viscosity-average molecular weight of 23,600 and a terminal OH group amount of 140 eq/$10^6$ g.

The thus obtained polycarbonate was measured for its $^1$H-NMR (using FX-90Q, manufactured by Nippon Denshi K.K.) using CDCl$_3$ as a solvent and tetramethyl silane as an internal standard A proton signal of a methylene group adjacent to a hydroxyl group was observed at δ3.4 ppm and it was confirmed that a terminal group was introduced from 4-(2-hydroxyethoxy)phenol.

A film of 30 μm in thickness was produced in the same manner as in Example 16. The properties of the thus obtained film are shown in Table 6.

EXAMPLE 18

Polymerization was carried out in the same manner as in Example 16 except that 2.4 parts of 4-(2-hydroxyethoxy) phenol and 2.2 parts of 4-t-butylphenol were used in place of 2.8 parts of 4-(2-hydroxyethyl)phenol as an endcapping agent to obtain a polycarbonate. The thus obtained polycarbonate had a viscosity-average molecular weight of 18,500 and a terminal OH group amount of 124 eq/10$^6$ g.

The thus obtained polycarbonate was measured for its $^1$H-NMR (using FX-90Q, manufactured by Nippon Denshi) using CDCl$_3$ as a solvent and tetramethyl silane as an internal standard. A proton signal of a methylene group adjacent to a hydroxyl group was observed at δ3.4 ppm and it was confirmed that a terminal group was introduced from 4-(2-hydroxyethoxy)phenol.

A film of 30 μm in thickness was produced in the same manner as in Example 16. The properties of the thus obtained film are shown in Table 6.

Comparative Example 2

Polymerization was carried out in the same manner as in Example 16 except that 3.0 parts of 4-t-butylphenol was used in place of 2.8 parts of 4-(2-hydroxyethyl)phenol as an endcapping agent to obtain a polycarbonate. The thus obtained polycarbonate had a viscosity-average molecular weight of 21,000 and a terminal OH group amount of 18 eq/10$^6$ g.

A film of 30 μm in thickness was produced in the same manner as in Example 16. The properties of the thus obtained film are shown in Table 6.

TABLE 6

|  | Ex. 16 | Ex. 17 | Ex. 18 | Comp. Ex. 2 |
|---|---|---|---|---|
| Mv | 21,000 | 23,600 | 18,500 | 21,000 |
| Terminal OH group amount (eq/10$^6$ g) | 168 | 140 | 124 | 18 |
| Peel strength (kg/cm) | 4.7 | 4.6 | 3.6 | 0.6 |
| Reduction rate of film elongation (%) | 10.0 | 13.8 | 12.7 | 4.3 |
| Film elongation before immersion in water (%) | 92 | 130 | 55 | 115 |
| Film elongation after immersion in water (%) | 83 | 112 | 48 | 110 |
| Resistance to impact after lapse of time (mA) | 0 | 0 | 0 | 0 |

EXAMPLES 19 TO 22 AND COMPARATIVE EXAMPLE 3

A predetermined amount of a bisphenol A polycarbonate (terminal OH group: 15 eq/10$^6$ g, viscosity-average molecular weight: 25,000), predetermined amounts shown in Table 7 of a polyester resin and a stabilizer were melt kneaded using a 30 mmφ unidirectionally rotating biaxial extruder (PCM30, manufactured by Ikegai Corporation) under such conditions as a polymer temperature of 290° C. and an average residence time of approximately 15 minutes, and the resulting mixture was extruded from a T die having a width of 300 mm and a slit thickness of 0.1 mm, attached to the end of the extruder. The resulting film was taken through a casting roller heated at 80° C. to produce a transparent film of approximately 30 μm in thickness. A polyethylene terephthalate film of 30 μm in thickness was used as Comparative Example 3.

The properties of these films are shown in Table 8.

TABLE 7

|  | Amount of polycarbonate (parts) | Polyester resin (parts) | Intrinsic viscosity | Stabilizer (part) |
|---|---|---|---|---|
| Ex. 19 | 80 | Polyethylene terephthalate (20) | 0.62 | — |
| Ex. 20 | 80 | Polytetramethylene terephthalate (20) | 0.88 | Triphenyl phosphate (0.02) |
| Ex. 21 | 90 | Polytetramethylene terephthalate (10) | 0.88 | Triphenyl phosphate (0.02) |
| Ex. 22 | 80 | Polyethylene terephthalate/ isophthalate copolymer (molar ratio 85/15) (20) | 0.64 | — |
| Comp. Ex. 3 | — | Polyethylene terephthalate (100) | 0.62 | — |

TABLE 8

| Example | 19 | 20 | 21 | 22 | Comp. Ex. 3 |
|---|---|---|---|---|---|
| Total amount of terminal OH and COOH groups (eq/10$^6$ g) | 31 | 29 | 26 | 30 | 90 |
| Peel strength (kg/cm) | 1.3 | 1.7 | 1.6 | 1.4 | 1.2 |
| Reduction rate of film elongation (%) | 9.1 | 16.7 | 3.8 | 4.5 | 96.9 |
| Film elongation before immersion in water (%) | 110 | 120 | 130 | 110 | 160 |
| Film elongation after immersion in water (%) | 100 | 100 | 125 | 105 | 5 |
| Resistance to impact after lapse of time (mA) | 0 | 0 | 0 | 0 | 0.35 |

EXAMPLES 23 TO 26 AND COMPARATIVE EXAMPLE 4

216 parts of diphenyl carbonate, 228 parts of bisphenol A, and 0.05 part of disodium salt of bisphenol A were charged into a reactor equipped with a stirrer and a vacuum distillation system with a nitrogen gas introduction port. After vacuum deaeration at room temperature, the operation of introducing a nitrogen gas was repeated three times to substitute the reaction system with nitrogen. Thereafter, the reactor was heated at 190° C. for 30 minutes under normal pressure to perform a reaction, and then depressurized gradually to 50 mmHg at the same temperature in 60 minutes. The reaction temperature was further elevated from 190° C. to 290° C. over approximately 60 minutes and the degree of vacuum was changed from 50 mmHg to 1 mmHg or less at the same time. Phenol generated by the reaction distilled out with progress of the reaction. The reaction was effected for 40 minutes under the same conditions to obtain a polycarbonate resin having a viscosity-average molecular weight (Mv) of 26,000 and a terminal OH group amount of 64 eq/$10^6$ g.

A predetermined amount shown in Table 9 of the thus obtained polycarbonate resin, predetermined amounts shown in Table 9 of a polyester resin and a stabilizer were melt kneaded, using a 30 mmφ unidirectionally rotating biaxial extruder (PCM30, manufactured by Ikegai Corporation) under such conditions as a polymer temperature of 290° C. and an average residence time of approximately 15 minutes, and the resulting mixture was extruded from a T die having a width of 30 mm and a slit thickness of 0.1 mm, attached to the end of the extruder. The resulting film was taken up through a casting roller heated at 80° C. to produce a film of approximately 30 μm in thickness.

The properties of these films are shown in Table 10.

TABLE 9

| | Amount of poly-carbonate (parts) | Polyester resin (parts) | Intrinsic viscosity | Stabilizer (part) |
|---|---|---|---|---|
| Ex. 23 | 80 | Polyethylene [1) terephthalate (20) | 0.63 | — |
| Ex. 24 | 80 | Polytetramethylene [2) terephthalate (20) | 0.90 | Triphenyl phosphate (0.02) |
| Ex. 25 | 90 | Polytetramethylene terephthalate (10) | 0.90 | Triphenyl phosphate (0.02) |
| Ex. 26 | 90 | Polyethylene terephthalate/ isophthalate copolymer (molar ratio 85/15) (10) | 0.64 | — |

In Table,
[1)] Produced using a germanium compound as a catalyst.
[2)] Produced using a titanium compound as a catalyst.

TABLE 10

| Example | 23 | 24 | 25 | 26 |
|---|---|---|---|---|
| Total amount of terminal OH and COOH groups (eq/$10^6$ g) | 70 | 65 | 60 | 73 |
| Peel strength (kg/cm) | 4.3 | 5.1 | 4.9 | 4.8 |
| Reduction rate of film elongation (%) | 8.3 | 5.6 | 9.1 | 10.5 |
| Film elongation before immersion in water (%) | 120 | 90 | 110 | 95 |
| Film elongation after immersion in water (%) | 110 | 85 | 100 | 85 |
| Resistance to impact after lapse of time (mA) | 0 | 0 | 0 | 0 |

EXAMPLES 27 TO 30

216 parts of diphenyl carbonate, 228 parts of bisphenol A, 0.05 part of disodium salt of bisphenol A, and 3.5 parts of spherical silica as a lubricant were charged into a reactor equipped with a stirrer and a vacuum distillation system with a nitrogen gas introduction port. After vacuum deaeration at room temperature, the operation of introducing a nitrogen gas was repeated three time to substitute the reaction system with nitrogen. Thereafter, the reactor was heated at 190° C. for 30 minutes under normal pressure to perform a reaction and depressurized gradually to 50 mmHg at the same temperature in 60 minutes. The reaction temperature was further elevated from 190° C. to 290° C. over approximately 60 minutes and the degree of vacuum was changed from 50 mmHG to 1 mmHg or less at the same time. Phenol generated by the reaction distilled out with progress of the reaction. The reaction was effected for 60 minutes under the same conditions to obtain a polycarbonate resin having a viscosity-average molecular weight of 32,000 and a terminal OH group amount of 80 eq/$10^6$ g.

A film of 30 μm in thickness was obtained from this polycarbonate resin in the same manner as in Examples 23 to 26 (see Table 11). The winding property of the film was good. Other properties of the film are shown in Table 12.

EXAMPLES 31 TO 33

225 parts of diphenyl carbonate, 228 parts of bisphenol A, 0.05 part of disodium salt of bisphenol A, and 3.5 parts of spherical silica as a lubricant were charged into a reactor equipped with a stirrer and a vacuum distillation system with a nitrogen gas introduction port. After vacuum deaeration at room temperature, the operation of introducing a nitrogen gas was repeated three times to substitute the reaction system with nitrogen. Thereafter, the reactor was heated at 190° C. for 30 minutes under normal pressure and then depressurized gradually to 50 mmHg in 60 minutes. The reaction temperature was further elevated from 190° C. to 290° C. over approximately 60 minutes and the degree of vacuum was changed from 50 mmHg to 1 mmHg or less at the same time. Phenol generated by the reaction distilled out with progress of the reaction. The reaction was effected for 50 minutes under the same conditions to obtain a polycarbonate resin having a viscosity-average molecular weight of 28,000 and a terminal OH group amount of 40 eq/$10^6$ g.

A film of 30 μm in thickness was obtained from this polycarbonate resin in the same manner as in Examples 23 to 26 (see Table 11). The winding property of the film was good. Other properties of the film are shown in Table 12.

TABLE 11

| | Amount of polycarbonate (parts) | Amount of polyester (parts) | Amount of lubricant in polymers (parts) |
|---|---|---|---|
| Example 27 | 100 | 0 | 0.1 |
| Example 28 | 90 | PET(10) | 0.09 |
| Example 29 | 90 | PBT(10) | 0.09 |
| Example 30 | 80 | PBT(20) | 0.08 |
| Example 31 | 100 | 0 | 0.1 |
| Example 32 | 90 | PBT(10) | 0.09 |
| Example 33 | 90 | PETI(10) | 0.09 |

In the table above, PET stands for polyethylene terephthalate (intrinsic viscosity: 0.63), PBT for polytetramethylene terephthalate (intrinsic viscosity: 0.90), and PETI for a polyester (intrinsic viscosity: 0.65) in which an acid component comprises 12 mol % of isophthalic acid and 88 mol % of terephthalic acid and a diol component is ethylene glycol.

TABLE 12

| Example | 27 | 28 | 29 | 30 | 31 | 32 | 33 |
|---|---|---|---|---|---|---|---|
| Total amount of terminal OH and COOH groups (eq/$10^6$ g) | 80 | 81 | 78 | 77 | 40 | 42 | 45 |
| Peel strength (kg/cm) | 4.5 | 5.0 | 5.1 | 5.5 | 4.0 | 4.5 | 4.5 |

TABLE 12-continued

| Example | 27 | 28 | 29 | 30 | 31 | 32 | 33 |
|---|---|---|---|---|---|---|---|
| Reduction rate of film elongation (%) | 3.8 | 10.5 | 9.1 | 5.6 | 4.2 | 5.0 | 10.5 |
| Film elongation before immersion in water (%) | 130 | 95 | 110 | 90 | 120 | 100 | 95 |
| Film elongation after immersion in water (%) | 125 | 85 | 100 | 85 | 115 | 95 | 85 |
| Resistance to impact after lapse of time (mA) | 0 | 0 | 0 | 0 | 0 | 0 | 0 |

EXAMPLES 34 TO 37

Predetermined amounts shown in Table 13 of a bisphenol A polycarbonate resin having a viscosity-average molecular weight of 25,000 and a terminal OH group amount of 15 eq/$10^6$ g, a polyester resin and a stabilizer were used and melt kneaded using a 30 mmφ unidirectionally rotating biaxial extruder (PCM30, manufactured by Ikegai Corporation) under such conditions as a polymer temperature of 270° C. and an average residence time of approximately 15 minutes. The resulting mixture was extruded from a T die having a width of 300 mm and a slit thickness of 0.1 mm, attached to the end of the extruder. The resulting film was taken up through a casting roller heated at 80° C. to produce a film of approximately 25 μm in thickness. The properties of the thus obtained film are shown in Table 14.

TABLE 13

| | Amount of poly-carbonate (parts) | Polyester resin (parts) | Intrinsic viscosity | Stabilizer |
|---|---|---|---|---|
| Ex. 34 | 20 | Polyethylene terephthalate (80) | 0.62 | Triphenyl phosphate (0.02) |
| Ex. 35 | 20 | Polyethylene terephthalate/ isophthalate copolymer (molar ratio 85/15) (80) | 0.64 | Triphenyl phosphate (0.02) |
| Ex. 36 | 20 | Polyethylene terephthalate (70)/ polytetramethylene terephthalate (10) composition | — | Triphenyl phosphate (0.02) |
| Ex. 37 | 10 | Polyethylene terephthalate (90) | 0.62 | — |

TABLE 14

| Example | 34 | 35 | 36 | 37 |
|---|---|---|---|---|
| Total amount of terminal OH and COOH groups (eq/$10^6$ g) | 79 | 78 | 76 | 86 |
| Peel strength (kg/cm) | 4.0 | 3.5 | 4.0 | 4.5 |
| Reduction rate of film elongation (%) | 5 | 17 | 15 | 20 |
| Resistance to impact after lapse of time (mA) | 0 | 0 | 0 | 0 |

EXAMPLES 38 TO 41

Predetermined amounts shown in Table 15 of a bisphenol A polycarbonate resin having a viscosity-average molecular weight of 25,000 (terminal OH group amount: 15 eq/$10^6$ g), a polyester resin and a stabilizer were used and melt kneaded using a 30 mmφ unidirectionally rotating biaxial extruder (PCM30, manufactured by Ikegai Corporation) under such conditions as a polymer temperature of 270° C. and an average residence time of approximately 15 minutes. The resulting mixture was extruded from a T die having a width of 300 mm and a slit thickness of 0.1 mm, attached to the end of the extruder. The resulting film was taken up through a casting roller heated at 80° C. to produce a film of approximately 25 μm in thickness. The properties of the thus obtained film are shown in Table 16.

EXAMPLES 42 TO 46 AND COMPARATIVE EXAMPLE 4

An unoriented transparent film of approximately 300 μm in thickness was produced in the same manner as Examples 38 to 41 except that a T die having a width of 150 mm and a slit thickness of 0.3 mm was used. Thereafter, this unoriented film was cut into 100 mm in square test samples, each of which was then biaxially oriented to 3.5 times simultaneously in both longitudinal and transverse directions at an orientation temperature shown in Table 15. The test samples were thermally set at 190° C. to obtain biaxially oriented films. Each of the thus obtained films was 25 μm in thickness.

TABLE 15

| | Amount of poly-carbonate (parts) | Polyester resin (parts) | Intrinsic viscosity | Stabilizer | Stretching temp. |
|---|---|---|---|---|---|
| Ex. 38 | 30 | Polyethylene [1] terepthalate (70) | 0.62 | Triphenyl phosphate (0.02) | Un-stretched |
| Ex. 39 | 30 | Polyethylene terephthalate/ isophthalate copolymer (molar ratio 85/15) (70) | 0.64 | Triphenyl phosphate (0.02) | Un-stretched |
| Ex. 40 | 30 | Polyethylene terephthalate (60)/polytetra-methyleneterephthalate(10) composition [2] | 0.62/0.88 | Triphenyl phosphate (0.02) | Un-stretched |
| Ex. 41 | 40 | Polyethylene [1] terephthalate (60) | 0.62 | Triphenyl phosphate (0.02) | Un-stretched |
| Ex. 42 | 10 | Polyethylene terephthalate (90) | 0.62 | Triphenyl phosphate (0.02) | 95 |
| Ex. 43 | 20 | Polyethylene terephthalate (80) | 0.62 | Triphenyl phosphate (0.02) | 105 |
| Ex. 44 | 40 | Polyethylene [1] terephthalate (60) | 0.62 | Triphenyl phosphate (0.02) | 125 |
| Ex. 45 | 20 | Polyethylene terephthalate/ isophthalate copolymer (molar ratio 85/15) (80) | 0.64 | Triphenyl phosphate (0.02) | 105 |

TABLE 15-continued

| | Amount of poly-carbonate (parts) | Polyester resin (parts) | Intrinsic viscosity | Stabilizer | Stretching temp. |
|---|---|---|---|---|---|
| Ex. 46 | 20 | Polyethylene terephthlaate (70)/polytetra-methyleneterephthalate(10) composition [2)] | 0.62/0.88 | Triphenyl phosphate (0.02) | 95 |
| Comp. Ex. 4 | — | Polyethylene terephthalate (100) | 0.62 | — | 95 |

In the table above,
[1)]Produced using a germanium compound as a catalyst.
[2)]Polytetramethylene terephthalate in the composition was produced using a titanium compound as a catalyst.

TABLE 16

| Example | 38 | 39 | 40 | 41 | 42 | 43 | 44 | 45 | 46 | Comp. Ex.4 |
|---|---|---|---|---|---|---|---|---|---|---|
| Total amount of terminal OH and COOH groups (eq/$10^6$g) | 70 | 68 | 66 | 65 | 86 | 87 | 65 | 78 | 76 | 90 |
| Peel strength (kg/cm) | 3.5 | 3.0 | 3.5 | 3.0 | 4.5 | 4.0 | 3.0 | 3.5 | 4.0 | 4.7 |
| Reduction rate of film elongation (%) | 25 | 19 | 23 | 4 | 10 | 3 | 0 | 8 | 7 | 35 |
| Film elongation before immersion in water (%) | 340 | 320 | 310 | 250 | 125 | 128 | 95 | 104 | 100 | 130 |
| Film elongation after immersion in water (%) | 255 | 260 | 240 | 240 | 113 | 124 | 95 | 96 | 93 | 85 |
| Resistance to impact after lapse of time mA | 0 | 0 | 0 | 0 | 0 | 0 | 0 | 0 | 0 | 0.45 |

TABLE 17

| | Copolymer component | | Melting point (°C.) | Glass transition temp. (°C.) |
|---|---|---|---|---|
| Film No. | Composition | Mole % | | |
| F1 | Isophthalic acid | 18 | 213 | 73 |
| F2 | Isophthalic acid | 12 | 229 | 73 |
| F3 | Isophthalic acid | 8 | 239 | 74 |
| F4 | Sebacic acid | 5 | 245 | 64 |

(production of polycarbonate)

216 parts of diphenyl carbonate, 228 parts of bisphenol A, and 0.05 part of disodium salt of bisphenol A were charged into a reactor equipped with a stirrer and a vacuum distillation system with a nitrogen gas introduction port. After vacuum deaeration at room temperature, the operation of introducing a nitrogen gas was repeated three times to substitute the reaction system with nitrogen. Thereafter, the reactor was heated at 190° C. for 30 minutes under normal pressure to perform a reaction and depressurized gradually to 50 mmHg at the same temperature in 60 minutes. The reaction temperature was further elevated from 190° C. to 290° C. over approximately 60 minutes and the degree of vacuum was changed from 50 mmHg to 1 mmHg or less at the same time. Phenol generated by the reaction distilled out with progress of the reaction. The reaction was effected for 40 minutes under the same conditions to obtain a polycarbonate resin having a viscosity-average molecular weight (Mv) of 26,000 and a terminal OH group amount of 73 eq/$10^6$ g.

The thus obtained polycarbonate was melt extruded at a polymer temperature of approximately 290° C. in the same manner as that for the production of the copolyester film to produce a film. At this time, the copolyester films F1 to F4 were supplied between the polycarbonate film and the casting roller to laminate two different films together. The resulting laminates were cooled to produce laminate films as Example 47 (F1-A2), Example 45 (F2-A2), Example 49 (F3-A2) and Example 50 (F4-A2), each consisting of a polyester layer (A1) and a polycarbonate layer (A2). These laminate films were approximately 25 μm in thickness.

The properties of these laminate films are shown in Table 18. Lamination was carried out in such a manner that the polycarbonate layer (A2) of each of the laminate films was in contact with a metal.

EXAMPLES 47 TO 50 AND COMPARATIVE EXAMPLE 5

(production of a copolyester film)

Polyethylene terephthalate (containing 0.3% by weight of titanium dioxide having a intrinsic viscosity of 0.64, a particle diameter ratio of 1.1 and an average particle diameter of 0.3 μm) prepared by copolymerizing components shown in Table 17 was dried by a conventional method and melt extruded from a slit die of an extruder at a polymer temperature of approximately 280° C. The resulting film was taken up through a casting roller to obtain an unoriented film. Thereafter, this unoriented film was drawn to 3.1 times at 110° C. in longitudinal direction and then to 3 times at 125° C. in transverse direction to obtain biaxially oriented films F1 to F4 which was thermally fixed at 190° C. These films were 6 μm in thickness.

TABLE 18

| Example | 47 | 48 | 49 | 50 | Comp. Ex. 5 |
|---|---|---|---|---|---|
| Terminal on group amount (eq/$10^6$ g) | 73 | 73 | 73 | 73 | 73 |
| Peel strength (kg/cm) | 4.0 | 4.0 | 4.0 | 4.0 | 3.5 |
| Resistance to impact after lapse of time (mA) | 0 | 0 | 0 | 0 | 0.25 |

Comparative Example 5 is a film which consists of only a polyester layer A1.

EXAMPLES 51 TO 54 AND COMPARATIVE EXAMPLE 6

(1) 216 parts of diphenyl carbonate, 228 parts of bisphenol A, and 0.05 part of disodium salt of bisphenol A were charged into a reactor equipped with a stirrer and a vacuum distillation system with a nitrogen gas introduction port. After vacuum deaeration at room temperature, the operation of introducing a nitrogen gas was repeated three times to substitute the reaction system with nitrogen. Thereafter, the reactor was heated at 190° C. for 30 minutes under normal pressure to perform a reaction and depressurized gradually to 50 mmHg at the same temperature in 60 minutes. The reaction temperature was further elevated from 190° C. to 290° C. over approximately 60 minutes and the degree of vacuum was changed from 50 mmHg to 1 mmHg or less at the same time. Phenol generated by the reaction distilled out with progress of the reaction. The reaction was effected for 40 minutes under the same conditions to obtain a polycarbonate resin having a viscosity-average molecular weight (Mv) of 26,000 and a terminal OH group amount of 73 eq/$10^6$ g.

(2) Polyethylene terephthalate (containing 0.3% by weight of titanium dioxide having an intrinsic viscosity of 0.64, and an average particle diameter of 0.3 μm) and the polycarbonate produced in the above step (1) were dried by a conventional method, and fed to two extruders for co-extruding two layers to produce laminate films. The polyethylene terephthalate and the polycarbonate were melt extruded from a slit for co-extrusion at a polymer temperature of 280° C. and a polymer temperature of 300° C., respectively. These co-extruded films were taken up through a casting drum with the polyethylene terephthalate being the inner side of the film to produce a laminate film. At this time, different laminate films which differ in film thickness as shown in Table 19 were obtained by changing the feed rate and film take-up rate of these polymers.

For comparison, a polyester/polycarbonate laminate film (Comparative Example 6) was produced using polycarbonate having a viscosity-average molecular weight (Mv) of 25,000 and a terminal OH group amount of 13 eq/$10^6$ g as a polycarbonate layer (A2) in the above example.

TABLE 19

| | Film thickness (μm) | |
|---|---|---|
| | Polyethylene terephthalate | Polycarbonate |
| Example 51 | 12 | 8 |
| Example 52 | 15 | 8 |
| Example 53 | 18 | 6 |

TABLE 19-continued

| | Film thickness (μm) | |
|---|---|---|
| | Polyethylene terephthalate | Polycarbonate |
| Example 54 | 20 | 6 |
| Comp. Example 6 | 15 | 8 |

The properties of these laminate films are shown in Table 20. Lamination was carried out in such a manner that the polycarbonate layer of each of the laminate films was in contact with a metal.

EXAMPLE 55

A laminate film was produced in the same manner as in Example 51 except that 0.5% by weight of a polyepoxy compound (Epikote 828, manufactured by Yuka Shell Epoxy K.K.) was contained in the polycarbonate and evaluated according to the above method. Results are shown in Table 20.

TABLE 20

| Example | 51 | 52 | 53 | 54 | 55 | Comp. Ex. 6 |
|---|---|---|---|---|---|---|
| Terminal OH group amount (eq/$10^6$ g) | 73 | 73 | 73 | 73 | 73 | 13 |
| Peel strength (kg/cm) | 4.0 | 4.0 | 4.0 | 4.0 | 4.0 | 0.5 |
| Resistance to impact after lapse of time (mA) | 0 | 0 | 0 | 0 | 0 | 0 |

EXAMPLES 56 TO 61

Polyester film layers (A1) were prepared from copolyethylene terephthalate containing isophthalic acid as a comonomer (12 or 8 mol %), copolyethylene terephthalate containing sebacic acid as a comonomer (5 mol %), polyethylene terephthalate and polytetramethylene terephthalate, or a 50/50 (weight ratio) blend of the latter two, which were shown in Table 21 and each contains 0.3% by weight of titanium dioxide having an average particle diameter of 0.3 μm), and a polyester film layer (A2) was prepared from polycarbonate having a viscosity-average molecular weight of 25,000 and a terminal OH group amount of 10 eq/$10^6$ g. These film layers were separately dried by a conventional method, molten, and co-extruded from adjacent dies. The resulting films were laminated and fused together and quenched for solidification to produce six different laminate films shown in Table 21.

In Table 21, IA stands for isophthalic acid, SA for sebacic acid, PET for polyethylene terephthalate, and PBT for polytetramethylene terephthalate.

TABLE 21

| | Layer (A-1) | | | | Film thickness of layer (A2) (μm) | Film thickness of laminated film (μm) |
|---|---|---|---|---|---|---|
| Ex. | Polyester (Intrinsic viscosity) | Tm (°C.) | Tg (°C.) | Film thickness (μm) | | |
| 56 | IA 12 mol % Co-PET (0.64) | 229 | 73 | 5 | 20 | 25 |

TABLE 21-continued

| Ex. | Layer (A-1) Polyester (Intrinsic viscosity) | Tm (°C.) | Tg (°C.) | Film thickness (μm) | Film thickness of layer (A2) (μm) | Film thickness of laminated film (μm) |
|---|---|---|---|---|---|---|
| 57 | IA 8 mol % Co-PET (0.63) | 239 | 74 | 5 | 20 | 25 |
| 58 | SA 5 mol % Co-PET (0.65) | 245 | 64 | 6 | 20 | 26 |
| 59 | PET(0.64) | 256 | 76 | 5 | 20 | 25 |
| 60 | PBT(0.72) | 223 | 20 | 6 | 20 | 26 |
| 61 | PET(0.64) PBT(0.72) 50/50 blend | — | — | 6 | 20 | 26 |

The properties of these laminate films are shown in Table 22. Lamination was carried out in such a manner that the polyester layer of each of the laminate films was in contact with a metal.

TABLE 22

| Example | 56 | 57 | 58 | 59 | 60 | 61 |
|---|---|---|---|---|---|---|
| Peel strength (kg/cm) | 3.5 | 3.7 | 3.5 | 4.7 | 5.0 | 4.8 |
| Resistance to impact after lapse of time (mA) | 0 | 0 | 0 | 0 | 0 | 0 |

EXAMPLES 62 TO 65
(production of copolyester films)

Copolyethylene terephthalate (containing 0.3% by weight of titanium dioxide having an intrinsic viscosity of 0.64 and an average particle diameter of 0.3 μm) containing isophthalic acid or sebacic acid as a comonomer in an amount shown in Table 23 was dried by a conventional method and melt extruded with a slit die of an extruder at a polymer temperature of approximately 280° C. The resulting film was taken up through a casting roller to obtain an unoriented film. Thereafter, this unoriented film was drawn to 3.1 times at 110° C. in longitudinal direction and then to 3 times at 125° C. in transverse direction, and thermally set at 190° C. to obtain a biaxially oriented film. The thus obtained film was 6 μm in thickness.

The melting points (measured according to DSC) and glass transition points of the copolyesters (polymer Nos.1 to 4) are shown in Table 23.

TABLE 23

| Polymer No. | Copolymer component Composition | Mole % | Melting point (°C.) | Glass transition temp. (°C.) |
|---|---|---|---|---|
| 1 | Isophthalic acid | 18 | 213 | 73 |
| 2 | Isophthalic acid | 12 | 229 | 73 |
| 3 | Isophthalic acid | 8 | 239 | 74 |
| 4 | Sebacic acid | 5 | 245 | 64 |

(production of laminate films)

160 parts by weight of a bisphenol A polycarbonate resin (to be abbreviated as PC) having a viscosity-average molecular weight of 25,000 (terminal OH group amount of 15 eq/$10^6$ g) and 40 parts by weight of a polyethylene terephthalate resin (to be abbreviated as PET) having an intrinsic viscosity of 0.6 were dried by a conventional method and then melt extruded from a slit die of an extruder at a polymer temperature of approximately 290° C. to produce a film. At this time, when the above-mentioned blend polymer films (PC+PET) are produced, the copolyester film obtained from the polymer Nos.1 to 4 in the manner described above was fed between a casting roller and the blend polymer film, laminated together, and cooled to produce laminate films, each consisting of a polyester layer (A1) and a blend polymer layer (A2). These laminate films were approximately 30 μm in thickness. The properties of the laminate films are shown in Table 24. Each of the laminate films was laminated in such a manner that the blend polymer layer was in contact with a metal.

TABLE 24

| Example | 62 | 63 | 64 | 65 |
|---|---|---|---|---|
| Total amount of terminal OH and COOH groups (eq/$10^6$ g) | 31 | 31 | 31 | 31 |
| Peel strength (kg/cm) | 1.3 | 1.3 | 1.3 | 1.3 |
| Resistance to impact after lapse of time (mA) | 0 | 0 | 0 | 0 |

EXAMPLES 66 TO 69

A laminate film was produced in the same manner as in Examples 62 to 65 except that-a polytetramethylene terephthalate resin (PBT) (tetrabutyl titanate catalyst, intrinsic viscosity: 0.9) was used in place of the polyethylene terephthalate resin (PET) of the above-mentioned Examples 62 to 65 and evaluated.

Results are shown in Table 25.

TABLE 25

| Example | 66 | 67 | 68 | 69 |
|---|---|---|---|---|
| Total amount of terminal OH and COOH groups (eq/$10^6$ g) | 29 | 29 | 29 | 29 |
| Peel strength (kg/cm) | 1.7 | 1.7 | 1.7 | 1.7 |
| Resistance to impact after lapse of time (mA) | 0 | 0 | 0 | 0 |

EXAMPLES 70 TO 74
(production of polycarbonate)

216 parts of diphenyl carbonate, 228 parts of bisphenol A, and 0.05 part of disodium salt of bisphenol A were charged into a reactor equipped with a stirrer and a vacuum distillation system with a nitrogen gas introduction port. After vacuum deaeration at room temperature, the operation of introducing a nitrogen gas was repeated three times to substitute the reaction system with nitrogen. Thereafter, the reactor was heated at 190° C. for 30 minutes under normal pressure to perform a reaction and then depressurized gradually to 50 mmHg at the same temperature in 60 minutes. The reaction temperature was further elevated from 190° C. to 290° C. over approximately 60 minutes and the degree of vacuum was changed from 50 mmHg to 1 mmHg or less at the same time. Phenol generated by the reaction distilled out with progress of the reaction. The reaction was effected for 70 minutes under the same conditions to obtain a polycarbonate resin having a viscosity-average molecular weight (Mv) of 28,000 and a terminal OH group amount of 48 eq/$10^6$ g.

Polyethylene terephthalate (containing a germanium dioxide catalyst and 0.2% by weight of titanium dioxide having an intrinsic viscosity of 0.64 and an average particle diameter of 0.3 μm) and a dry blend polymer comprising predetermined amounts of the polycarbonate and polyester produced above were dried by a conventional method, and fed to two extruders for co-extruding two layers to produce laminate films. The polyethylene terephthlate and the blend polymer were melt extruded from a slit for co-extrusion at a polymer temperature of 280° C. and 270° to 290° C., respectively. Co-extruded films were taken up through a casting drum with the polyethylene terephthalate being the inner side of the films to produce laminate films. At this time, some laminate films which differed in thickness as shown in Table 26 were obtained by changing the polymer feed rate and the film take-up rate.

TABLE 26

| | Film thickness of polyethylene terephthalate (μm) | Blend polymer Composition (wt. %) | | Film Thickness (μm) |
|---|---|---|---|---|
| | | Poly-carbonate | Polyester | |
| Example 70 | 15 | 85 | Polytetramethylene terephthalate 15 | 5 |
| Example 71 | 12 | 85 | Polytetramethylene terephthalate 15 | 10 |
| Example 72 | 15 | 90 | Polyethylene terephthalate 10 | 5 |
| Example 73 | 15 | 80 | Polyethylene terephthalate 20 | 10 |
| Example 74 | 12 | 85 | Polyethylene terephthalate/ isophthalate (molar ratio 88/12) 15 | 10 |

The properties of these laminate films are shown in Table 27.

These laminate films were laminated in such a manner that the blend polymer side was in contact with a metal.

TABLE 27

| Example | 70 | 71 | 72 | 73 | 74 |
|---|---|---|---|---|---|
| Total amount of terminal OH and COOH groups (eq/10$^6$ g) | 50 | 50 | 53 | 57 | 53 |
| Peel gtrength (kg/cm) | 5.0 | 5.0 | 5.0 | 4.5 | 4.0 |
| Resistance to impact after lapse of time (mA) | 0 | 0 | 0 | 0 | 0 |

EXAMPLES 75 TO 76

(production of polyester film)

A polyester film of Polymer No.2 shown in Table 23 was used as the polyester film.

(production of laminate films)

A bisphenol A polycarbonate resin having a viscosity-average molecular weight of 25,000 and a terminal OH group amount of 15 eq/10$^6$ g and a dry blend polymer comprising a predetermined amount of a polyester having an intrinsic viscosity of 0.6 shown in Table 28 were dried by a conventional method and melt extruded from a slit die of an extruder at a polymer temperature of approximately 290° C. to produce films. At this time, when a film of the above-mentioned blend polymer is produced, a polyester film was fed between a casting roller and the blend polymer film so as to laminate these two films together. The resulting laminate was cooled to produce a laminate film consisting of a polyester layer (A1) and a blend polymer layer (A2). This laminate film was approximately 30 μm in thickness.

TABLE 28

| | Polyester layer (A1) | Blend polymer layer (A2) Composition (wt. %) | | |
|---|---|---|---|---|
| | | Poly-carbonate | Polyester | |
| 75 | 2 | 20 | Same as above | 80 |
| 76 | 2 | 20 | Polyethylene terephthalate/ isophthalate copolymer (molar ratio 88/12) | 80 |

The properties of these laminate films are shown in Table 29.

TABLE 29

| Example | 75 | 76 |
|---|---|---|
| Total amount of terminal OH and COOH groups (eq/10$^6$ g) | 71 | 69 |
| Peel strength (kg/cm) | 4.0 | 3.5 |
| Dent resistance (mA) | 0 | 0 |

The laminate films of Examples 75 and 76 were laminated in such a manner that the polyester layer (A1) was in contact with a metal.

EXAMPLES 77 TO 79

(production of polycarbonate)

216 parts of diphenyl carbonate, 228 parts of bisphenol A, and 0.05 part of disodium salt of bisphenol A were charged into a reactor equipped with a stirrer and a vacuum distillation system with a nitrogen gas introduction port. After vacuum deaeration at room temperature, the operation of introducing a nitrogen gas was repeated three times to substitute the reaction system with nitrogen. Thereafter, the reactor was heated at 190° C. for 30 minutes under normal pressure to perform a reaction and then depressurized gradually to 50 mmHg at the same temperature in 60 minutes. The reaction temperature was further elevated from 190° C. to 290° C. over approximately 60 minutes and the degree of vacuum was changed from 50 mmHg to 1 mmHg or less at the same time. Phenol generated by the reaction distilled out with progress of the reaction. The reaction was effected for 70 minutes under the same conditions to obtain a polycarbonate resin having a viscosity-average molecular weight (Mv) of 28,000 and a terminal OH group amount of 48 eq/10$^6$ g.

Polyethylene terephthalate (containing 0.2% by weight of titanium dioxide having an intrinsic viscosity of 0.64 and an average particle diameter of 0.3 μm) and a dry blend polymer comprising predetermined amounts of the polycarbonate and polyester produced above were dried by a conventional method, and fed to two extruders for co-extruding two layers to produce laminate films. The polyethylene terephthlate and the blend polymer were melt extruded from a slit for co-extrusion at a polymer temperature of 280° C. and 270° to 290° C., respectively. The co-extruded films were taken up through a casting drum with the polyethylene terephthalate being the inner side of the films to produce laminate films. At this time, some laminate films which differed in thickness as shown in Table 30 were obtained by changing the polymer feed rate and the film take-up rate.

TABLE 30

| | Polyester layer (A1) Film thickness of polyethylene terephthalate (μm) | Blend polymer layer (A2) Composition (wt. %) | | |
|---|---|---|---|---|
| | | Poly-carbonate | Polyester | Film Thickness (μm) |
| Example 77 | 15 | 20 | Polyethylene terephthalate 80 | 15 |
| Example 78 | 15 | 10 | Polyethylene terephthalate/ isophthalate copolymer (molar ratio 88/12) 80 | 10 |
| Example 79 | 15 | 10 | Polyethylene 90 terephthalate | 15 |

The properties of the above-mentioned laminate films are shown in Table 31. These laminate films were laminated in such a manner that the polyester layer (A1) was in contact with a metal and evaluated.

TABLE 31

| Example | 77 | 78 | 79 |
|---|---|---|---|
| Total amount of terminal OH and COOH groups (eq/$10^6$ g) | 82 | 80 | 86 |

TABLE 31-continued

| Example | 77 | 78 | 79 |
|---|---|---|---|
| Peel strength (kg/cm) | 4.0 | 3.5 | 5.0 |
| Resistance to impact after lapse of time (mA) | 0 | 0 | 0 |

EXAMPLES 80 TO 85

Polyethylene terephthalate and copolyethylene terephthalate shown in Table 32 (both containing 0.3% by weight of titanium dioxide having an average particle diameter of 0.3 μm) for the polyester film layer (A1), a polyester or a polyester blend shown in Table 32 for the polyester film layer (A3), and a polycarbonate having a viscosity-average molecular weight of 25,000 and a terminal OH group amount of 15 eq/$10^6$ g for the polycarbonate film layer (A2) were dried separately by a conventional method, molten and co-extruded from adjacent dies with the polycarbonate film layer (A2) being an intermediate layer sandwiched between the other two layers. The resulting films were laminated and fused together, and rapidly cooled for solidification to produce six different laminate films shown in Table 32.

In Table 32, IA stands for isophthalic acid, PET for polyethylene terephthalate, and PBT for polytetramethylene terephthalate.

Thickness of each layer of each of the films is shown in Table 32.

TABLE 32

| Ex. | Layer (A1) Polyester (intrinsic viscosity) | Tm (°C.) | Tg (°C.) | Film thickness (μm) | Film thickness of layer (A2) (μm) | Layer (A3) Polyester (intrinsic viscosity) | Tm (°C.) | Tg (°C.) | Film thickness (μm) | Film thickness of laminated film (μm) |
|---|---|---|---|---|---|---|---|---|---|---|
| 80 | IA 12 mol% Co-PET (0.64) | 229 | 73 | 6 | 5 | PBT (0.72) | 224 | 25 | 10 | 21 |
| 81 | IA 12 mol% Co-PET (0.64) | 229 | 73 | 6 | 5 | IA 12 mol% Co-PET (0.64) | 229 | 73 | 10 | 21 |
| 82 | IA 8 mol% Co-PET (0.63) | 239 | 74 | 10 | 6 | PET(0.64)/ PBT(0.72) 50/50 wt. % blend | — | — | 8 | 24 |
| 83 | IA 8 mol% Co-PET (0.63) | 239 | 74 | 6 | 5 | PET(0.64)/ PBT(0.72) 50/50 wt. % blend | — | — | 10 | 21 |
| 84 | PET(0.64) | 256 | 70 | 11 | 4 | PET(0.64 )/ PBT(0.72) 50/50 wt. % blend | — | — | 5 | 20 |
| 85 | PET(0.64) | 256 | 70 | 5 | 5 | PET(0.64)/ PBT(0.72) 50/50 wt. % blend | — | — | 10 | 20 |

The properties of these laminate films are shown in Table 33. Lamination was carried out in such a manner that the layer A3 of each of the laminate films was in contact with a metal.

TABLE 33

| Example | 80 | 81 | 82 | 83 | 84 | 85 |
|---|---|---|---|---|---|---|
| Peel strength (kg/cm) | 4.4 | 4.8 | 5.0 | 4.8 | 3.9 | 4.1 |
| Resistance to impact after lapse of time (mA) | 0 | 0 | 0 | 0 | 0 | 0 |

What is claimed is:

1. A multi-layer film to be laminated on a metal which is formed of
   (A1) a first layer of a polyester resin having a melting point of more than 200° C., and
   (A2) a second layer of
      (i) a polycarbonate resin which consists essentially of a recurring unit represented by the following formula (1)

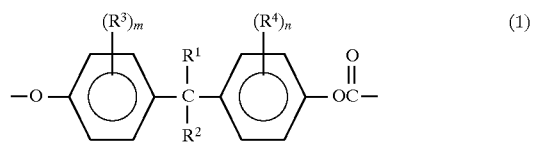

wherein $R^1$ and $R^2$ are independent from each other and are each hydrogen atom, an alkyl group having 1 to 5 carbon atoms, or a cycloalkyl group having 5 to 6 ring carbon atoms, or $R^1$ and $R^2$ may form a cycloalkyl group having 5 to 6 ring carbon atoms together with a carbon atom to which $R^1$ and $R^2$ are bonded, $R^3$ and $R^4$ are independent from each other and are each an alkyl group having 1 to 5 carbon atoms, a phenyl group, or a halogen atom, and m and n are independent from each other and are 0, 1 or 2, or
      (ii) a resin composition comprising a phosphorus compound, a polyester resin having a melting point of more than 200° C. which is a polyester resin in which at least 70 mol % of a dicarboxylic acid component is terephthalic acid and/or isophthalic acid and at least 70 mol % of a diol component is ethylene glycol and/or tetramethylene glycol and a polycarbonate resin which consists essentially of a recurring unit represented by the above formula (1), the amount of the polycarbonate resin contained in the resin composition being at least 1% by weight based on the total weight of the polyester resin and the polycarbonate resin
   which exhibits only a current value of 0.1 mA or less when it is laminated on a steel plate, impact is given on the resulting laminate, and electricity is applied to the laminate (impact resistance test); and
   which has a total thickness in the range of 5 to 100 μm.

2. The multi-layer film of claim 1, wherein the second layer is formed of a polycarbonate resin and, when the second layer is laminated on a metal, the polycarbonate resin has terminal OH groups of at least 20 eq/$10^6$ g and a viscosity-average molecular weight of 10,000 to 40,000.

3. The multi-layer film of claim 1, wherein, when the second layer is formed of a resin composition comprising a polyester resin and a polycarbonate resin, the amount of the polycarbonate resin is 50 to 99% by weight based on the total weight of the two resins, and when the second layer is laminated on a metal, the resin composition has a total amount of the terminal OH and COOH groups of at least 25 eq/$10^6$ g.

4. The multi-layer film of claim 1, wherein, when the second layer is formed of a resin composition comprising a polyester resin and a polycarbonate resin, the polycarbonate resin is 1 to 50% by weight based on the total weight of the two resins, and when the second layer is laminated on a metal, the resin composition has a total amount of the terminal OH and COOH groups of at least 25 eq/$10^6$ g.

5. The film of claim 1, which contains a polyepoxy compound containing two or more epoxy groups in the molecule in the second layer (A2) in an amount of 0.1 to 5 parts by weight based on 100 parts by weight of the polycarbonate resin (i) or the resin composition (ii) forming the second layer.

6. The film of claim 1, which contains fine particles having an average particle diameter of 2.5 μm or less in the first layer (A1) in an amount of 0.01 to 1 part by weight based on 100 parts by weight of the polyester resin forming the first layer.

7. The film of claim 1, wherein the polyester resin contained in the resin composition forming the second layer (A2) is produced using a germanium compound and/or a titanium compound as a catalyst.

8. The multi-layer film of claim 1, wherein the polyester resin forming the first layer (A1) is biaxially oriented.

9. The multi-layer film of claim 1, which is formed of three layers consisting of the first layer (A1), the second layer (A2) and a third layer of a polyester resin having a melting point of more than 200° C., which are laminated one upon another in this order.

10. The multi-layer film of claim 1, wherein the polyester resin of the first layer having a melting point of more than 200° C. is a polyester resin in which at least 70 mol % of a dicarboxylic acid component is terephthalic acid and/or isophthalic acid and at least 70 mol % of a diol component is ethylene glycol and/or tetramethylene glycol.

11. The multi-layer film of claim 1, wherein the phosphorus compound functions as a suppressor of reaction between the polycarbonate resin and the polyester resin.

12. The film of claim 5, wherein said polyepoxy compound containing two or more epoxy groups in the molecule is a glycidyl ether of an aromatic polyol selected from the group consisting of 2,2-bis (4-hydroxyphenyl) propane, 1,1-bis (4-hydroxyphenyl) ethane, 1,1-bis (4-hydroxyphenyl) cyclohexane, 4,4'-dihydroxydiphenyl methane, 4,4'-dihydroxydiphenyl ether, 4,4'-dihydroxydiphenyl sulfone, resorcinol, phenol novolak, cresol novolak and naphthol novolak; a glycidyl ether of a polyol obtained by a dehydrocondensation reaction between an aromatic hydroxy compound selected from the group consisting of phenol and naphthol and an aldehyde selected from the group consisting of glyoxal, glutaraldehyde, benzaldehyde and p-hydroxybenzaldehyde in the presence of an acid catalyst; or a glycidyl ether of a polyol selected from the group consisting of butanediol, neopentylene glycol, glycerol, polyethylene glycol and polypropylene glycol.

13. The film of claim 5, where said polyepoxy compound containing two or more epoxy groups in the molecule is a glycidyl ester of a polycarboxylic acid selected from the group consisting of phthalic acid, isopolthalic acid, naphthalene dicarboxylic acid and trimellitic acid.

14. The film of claim 5, wherein said polyepoxy compound containing two or more epoxy groups in the molecule is an N-glycidyl compound prepared by substituting active hydrogen coupled to the nitrogen atom of a nitrogen-containing compound selected from the group consisting of aniline, isocyanuric acid and 4,4'-diaminodiphenyl methane.

15. The film of claim 5, wherein said polyepoxy compound containing two or more epoxy groups in the molecule is a glycidyl ether ester of a hydroxycarboxylic acid selected from the group consisting of p-hydroxybenzoic acid hydroxynaphthoic acid.

16. The film of claim 5, wherein said polyepoxy compound containing two or more epoxy groups in the molecule is an epoxy resin obtained from an unsaturated alicyclic compound selected from the group consisting of cyclopentadiene and dicyclopentadiene or a triglycidyl compound of p-aminophenol or vinylcyclohexene dioxide.

* * * * *